US012567179B1

(12) United States Patent
Xu et al.

(10) Patent No.: US 12,567,179 B1
(45) Date of Patent: Mar. 3, 2026

(54) SYSTEM AND METHOD FOR PROVIDING EXPLAINABLE ARTIFICIAL INTELLIGENCE WITHIN EXTENDED REALITY

(71) Applicant: Meta Platforms Technologies, LLC, Menlo Park, CA (US)

(72) Inventors: Xuhai Xu, Seattle, WA (US); Mengjie Yu, Bellevue, WA (US); Tanya Renee Jonker, Seattle, WA (US); Kashyap Todi, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 551 days.

(21) Appl. No.: 18/060,350

(22) Filed: Nov. 30, 2022

Related U.S. Application Data

(60) Provisional application No. 63/375,016, filed on Sep. 8, 2022.

(51) Int. Cl.
 *G06T 11/00* (2006.01)
 *G06N 5/045* (2023.01)
(52) U.S. Cl.
 CPC .............. *G06T 11/00* (2013.01); *G06N 5/045* (2013.01)
(58) Field of Classification Search
 CPC ................................ G06T 11/00; G06N 5/045
 See application file for complete search history.

(56) References Cited

U.S. PATENT DOCUMENTS

| | | | | |
|---|---|---|---|---|
| 11,842,454 B1* | 12/2023 | Lin | ......................... | H04N 23/60 |
| 2019/0221191 A1* | 7/2019 | Chhipa | .................... | G09G 3/002 |
| 2019/0303404 A1* | 10/2019 | Amer | ..................... | G06V 40/23 |
| 2019/0378476 A1* | 12/2019 | Jeon | ......................... | G09G 3/002 |
| 2022/0343647 A1* | 10/2022 | Jindal | .............. | G06F 18/24147 |
| 2022/0383864 A1* | 12/2022 | Gruber | .................... | G10L 13/08 |
| 2023/0066552 A1* | 3/2023 | Van Os | .............. | H04N 21/4394 |
| 2024/0249167 A1* | 7/2024 | Bonutti | .................. | G06N 5/045 |

OTHER PUBLICATIONS

Adomavicius G., et al., "Context-Aware Recommender Systems," Recommender systems handbook, Springer , 2011, pp. 217-253.
(Continued)

*Primary Examiner* — Terrell M Robinson
(74) *Attorney, Agent, or Firm* — Morgan, Lewis & Bockius LLP

(57) ABSTRACT

Features described herein generally relate to providing explainable artificial intelligence (XAI) within extended reality. Particularly, after obtaining input data, including environmental information, user state information, and user profile information, an extended reality system determines virtual content to be presented to a user via a head-mounted device. The extended reality system also identified additional contextual factors associated with this virtual content, including system goals, user goals, a current state of the user, a user's location, a current time, and a current environment of the user. These additional contextual details are then used to determine XAI content that describes one or more aspects of the virtual content (such as how the virtual content was determined based on the input data). The virtual content and the XAI content are then presented to the user by the extended reality system.

20 Claims, 17 Drawing Sheets

1100

1106

(56) References Cited

OTHER PUBLICATIONS

Ahmed I., et al., "From Artificial Intelligence to Explainable Artificial Intelligence in Industry 4.0: A Survey on What, How, and Where," IEEE Transactions on Industrial Informatics, Aug. 2022, vol. 18, No. 8, pp. 5031-5042.

Amershi S., et al., "Guidelines for Human-AI Interaction," In Proceedings of the 2019 CHI Conference on Human Factors in Computing Systems , ACM Press, May 2019, pp. 1-13.

Amini M., et al., "Discovering Injury Severity Risk Factors In Automobile Crashes: A Hybrid Explainable Ai Framework For Decision Support," Reliability Engineering & System Safety, Oct. 2022, vol. 226, 11 pages.

Antifakos S., et al., "Towards Improving Trust in Context-Aware Systems by Displaying System Confidence," In Proceedings of the 7th International Conference on Human-Computer Interaction with Mobile Devices & Services, Sep. 2005, pp. 9-14.

Antonenko P., et al., "Using Electroencephalography to Measure Cognitive Load," Educational Psychology Review, Apr. 29, 2010, vol. 22, No. 4, pp. 425-438.

Caruana R., et al., "Intelligible Models for Healthcare: Predicting Pneumonia Risk and Hospital 30-day Readmission," In Proceedings of the 21th ACM SIGKDD International Conference on Knowledge Discovery and Data Mining, Aug. 10, 2015, pp. 1721-1730.

Chong E., et al., Connecting Gaze, Scene, and Attention: Generalized Attention Estimation via Joint Modeling of Gaze and Scene Saliency, Proceedings of the European Conference on Computer Vision (ECCV), 2018, pp. 383-398.

Danry V., et al., "Wearable Reasoner: Towards Enhanced Human Rationality Through A Wearable Device With An Explainable AI Assistant," Conference: AHs '20: Augmented Humans International Conference, Mar. 2020, pp. 1-12.

Duchowski A.T., et al., "The Index of Pupillary Activity: Measuring Cognitive Load vis-à-vis Task Difficulty with Pupil Oscillation," In Proceedings of the 2018 CHI Conference on Human Factors in Computing Systems, ACM, Apr. 21, 2018, pp. 1-13.

Ehsan U., et al., "Expanding Explainability: Towards Social Transparency in AI Systems," In Proceedings of the 2021 CHI Conference on Human Factors in Computing Systems, May 7, 2021, pp. 1-19.

Eiband M., et al., "Bringing Transparency Design into Practice," In 23rd International Conference on Intelligent User Interfaces, Mar. 5, 2018, pp. 211-223.

Fathi A., et al., "Understanding Egocentric Activities," International Conference On Computer Vision (ICCV), Nov. 6, 2011, pp. 407-414.

Fogarty J., et al., "Predicting Human Interruptibility With Sensors," ACM Transactions on Computer-Human Interaction (TOCHI), Mar. 1, 2005, vol. 12 , No. 1, pp. 119-146.

Gjoreski H., et al., "Head-AR: Human Activity Recognition with Head-Mounted IMU Using Weighted Ensemble Learning," Springer, 2021, pp. 153-167.

Graesser A.C., et al., "Mechanisms that Generate Questions," Questions and information systems 2, 1992, 18 pages.

Henny A., et al., "Predicting User Intent Through Eye Gaze for Shared Autonomy," 2016 AAAI fall symposium series, 2016, 6 pages.

Herlocker J.L., et al., "Explaining Collaborative Filtering Recommendations," CSCW '00: Proceedings of the 2000 ACM conference on Computer supported cooperative work, Dec. 1, 2000, pp. 241-250.

Holiday D., et al., "User Trust in Intelligent Systems: A Journey Over Time," In Proceedings of the 21st international conference on intelligent user interfaces, Mar. 7, 2016, pp. 164-168.

Huang Y., et al., "Predicting Gaze in Egocentric Video by Learning Task Dependent Attention transition", The European Conference on Computer Vision (ECCV), 2018, pp. 754-769.

Joseph A.W., et al., "Potential Eye Tracking Metrics and Indicators to Measure Cognitive Load in Human-Computer Interaction Research," Journal of Scientific Research, Jan. 2020, vol. 64, No. 1, pp. 168-175.

Kim K., et al., "Understanding Users' Continuance Intention toward Smartphone Augmented Reality Applications," Information Development, Jun. 2014, vol. 32, No. 2, pp. 161-174.

Lam K.Y., et al., "A2W: Context-Aware Recommendation System for Mobile Augmented Reality Web Browser," In Proceedings of the 29th ACM International Conference on Multimedia, Oct. 2021, pp. 2447-2455.

Lee L-H., et al., "All One Needs to Know about Metaverse: A Complete Survey on Technological Singularity, Virtual Ecosystem, and Research Agenda," Journal of Latex Class Files, Sep. 2021, vol. 14, No. 8, 66 pages.

Leelasawassuk T., et al., "Estimating Visual Attention from a Head Mounted IMU," In Proceedings of the 2015 ACM International Symposium on Wearable Computers, Sep. 2015, pp. 147-150.

Letham B., et al., "Interpretable Classifiers Using Rules and Bayesian Analysis: Building a Better Stroke Prediction Model," The Annals of Applied Statistics, 2015, vol. 9, No. 3, pp. 1350-1371.

Liao Q.V., et al., "Questioning the AI: Informing Design Practices for Explainable AI User Experiences," In Proceedings of the 2020 CHI Conference on Human Factors in Computing Systems, 2020, pp. 1-15.

Lim B.Y., et al., "Assessing Demand for Intelligibility in Context-Aware Applications," In Proceedings of the 11th International Conference on Ubiquitous Computing, Sep. 2009, pp. 195-204.

Lim B.Y., et al., "Why and Why Not Explanations Improve the Intelligibility of Context-Aware Intelligent Systems," In Proceedings of the SIGCHI Conference on Human Factors in Computing Systems, 2009, pp. 2119-2128.

Lin S., "Explore and Eat Your Way around Town with Google Maps," May 8, 2018, Retrieved from the internet: URL: https://www.blog.google/products/maps/explore-around-towngoogle-maps/, 6 pages.

Lundberg S.M., et al., "A Unified Approach to Interpreting Model Predictions," Advances in Neural Information Processing Systems 2017—Decem, 2017, pp. 4766-4775.

Mohseni S., et al., "A Multidisciplinary Survey and Framework for Design and Evaluation of Explainable AI Systems," ACM Transactions on Interactive Intelligent Systems, Dec. 2021, vol. 1, No. 1, pp. 1-45.

Pielot M., et al., "Beyond Interruptibility: Predicting Opportune Moments to Engage Mobile Phone Users," Proceedings of the ACM on Interactive, Mobile, Wearable and Ubiquitous Technologies, Sep. 2017, vol. 1, No. 3, pp. 1-25.

Pu P., at al., "Trust Building with Explanation Interfaces," In Proceedings of the 11th International Conference on Intelligent User Interfaces, 2006, pp. 93-100.

Schröder M., et al., "Deep Learning for Action Recognition in Augmented Reality Assistance Systems," In ACM SIGGRAPH 2017 Posters, Jul. 2017, pp. 1-2.

Selvaraju R.R., et al., "Grad-Cam: Visual Explanations from Deep Networks via Gradient-Based Localization," In Proceedings of the IEEE International Conference on Computer Vision, 2017, pp. 618-626.

Shrikumar A., et al., "Learning Important Features Through Propagating Activation Differences," 34th International Conference on Machine Learning, Aug. 2017, vol. 70, pp. 4844-4866.

Singh S., et al., "First Person Action Recognition Using Deep Learned Descriptors," Proceedings of the IEEE Conference on Computer Vision and Pattern Recognition (CVPR), Jun. 27-30, 2016, pp. 2620-2628.

Soleymani M., et al., "Analysis of EEG Signals and Facial Expressions for Continuous Emotion Detection," IEEE Transactions on Affective Computing, May 22, 2015, vol. 7, No. 1, pp. 17-28.

Stappen L., et al., "X-Aware: Context-Aware Human-Environment Attention Fusion for Driver Gaze Prediction in the Wild," ICMI 20: Proceedings of the 2020 International Conference on Multimodal Interaction, Oct. 22, 2020, 11 pages.

(56)          References Cited

OTHER PUBLICATIONS

Taylor J.E.T., et al., "Artificial Cognition: How Experimental Psychology Can Help Generate Explainable Artificial Intelligence," Psychonomic Bulletin & Review, Nov. 6, 2020, vol. 28, No. 2, pp. 454-475.

Tsai C-H., et al., "Augmented Reality Display Based on User Behavior," Computer Standards & Interfaces, Jan. 2018, vol. 55, 29 pages.

TTC Labs, "People-Centric Approaches to Algorithmic Explainability," Apr. 2022, retrieved from the internet: URL: https://www.ttclabs.net/report/people-centric-approaches-toalgorithmic-Explainability, 4 pages.

Vortmann L.M., et al., "EEG-Based Classification Of Internally-And Externally-Directed Attention in an Augmented Reality Paradigm," Frontiers in Human Neuroscience, Oct. 9, 2019, vol. 13, 14 pages.

Wan C., et al., "A Wearable Head Mounted Display Bio-Signals Pad System for Emotion Recognition," Sensors 2022, Dec. 26, 2021, vol. 22, No. 1, 19 pages.

Wang D., et al., "Designing Theory-Driven User-Centric Explainable AI," CHI '19: Proceedings of the 2019 CHI Conference on Human Factors in Computing Systems, May 4-9, 2019, 15 pages.

Windau J., et al., "Walking Compass With Head-Mounted IMU Sensor," 2016 IEEE International Conference on Robotics and Automation (ICRA), May 16-21, 2016, pp. 5542-5547.

Wintersberger P., et al., "Fostering User Acceptance and Trust in Fully Automated Vehicles: Evaluating the Potential of Augmented Reality," Presence: Virtual and Augmented Reality, Feb. 1, 2018, vol. 27, No. 1, pp. 46-62.

Xu J., et al., "Review on Portable EEG technology in Educational Research," Computers in Human Behavior, Apr. 2018, vol. 81, 26 pages.

Yan Z., et al., "EmoGlass: an End-to-End AI-Enabled Wearable Platform for Enhancing Self-Awareness of Emotional Health," CHI 22: Proceedings of the 2022 CHI Conference on Human Factors in Computing Systems, Apr. 28, 2022, 19 pages.

Yarkoni T., et al., "Choosing Prediction over Explanation in Psychology: Lessons from Machine Learning," Perspectives on Psychological Science, Aug. 25, 2017, vol. 12, No. 6, 23 pages.

Yong H., et al., "Emotion Recognition in Gamers Wearing Head-Mounted Display," 2019 IEEE Conference on Virtual Reality and 3D User Interfaces (VR), Mar. 23-27, 2019, pp. 1251-1252.

Zagermann J., et al., "Studying Eye Movements As A Basis For Measuring Cognitive Load," Extended Abstracts of the 2018 CHI Conference On Human Factors In Computing Systems, Apr. 20, 2018, 6 pages.

Zhang Y., et al., "Explainable Recommendation: A Survey and New Perspectives," Foundations and TrendsR in Information Retrieval, Mar. 11, 2020, vol. 14, No. 1, 104 pages.

Zhu F., et al., "BISHARE: Exploring Bidirectional Interactions Between Smartphones and Head-Mounted Augmented Reality," Proceedings of the 2020 CHI Conference on Human Factors in Computing Systems ACM, Apr. 25-30, 2020, 14 pages.

Zimmermann R., et al., "Enhancing Brick-And-Mortar Store Shopping Experience with An Augmented Reality Shopping Assistant Application using Personalized Recommendations and Explainable Artificial Intelligence," Journal of Research in Interactive Marketing, Apr. 12, 2022, 26 pages.

* cited by examiner

350

360

355

365(A)

365(B)

460

465

470

480

500

600

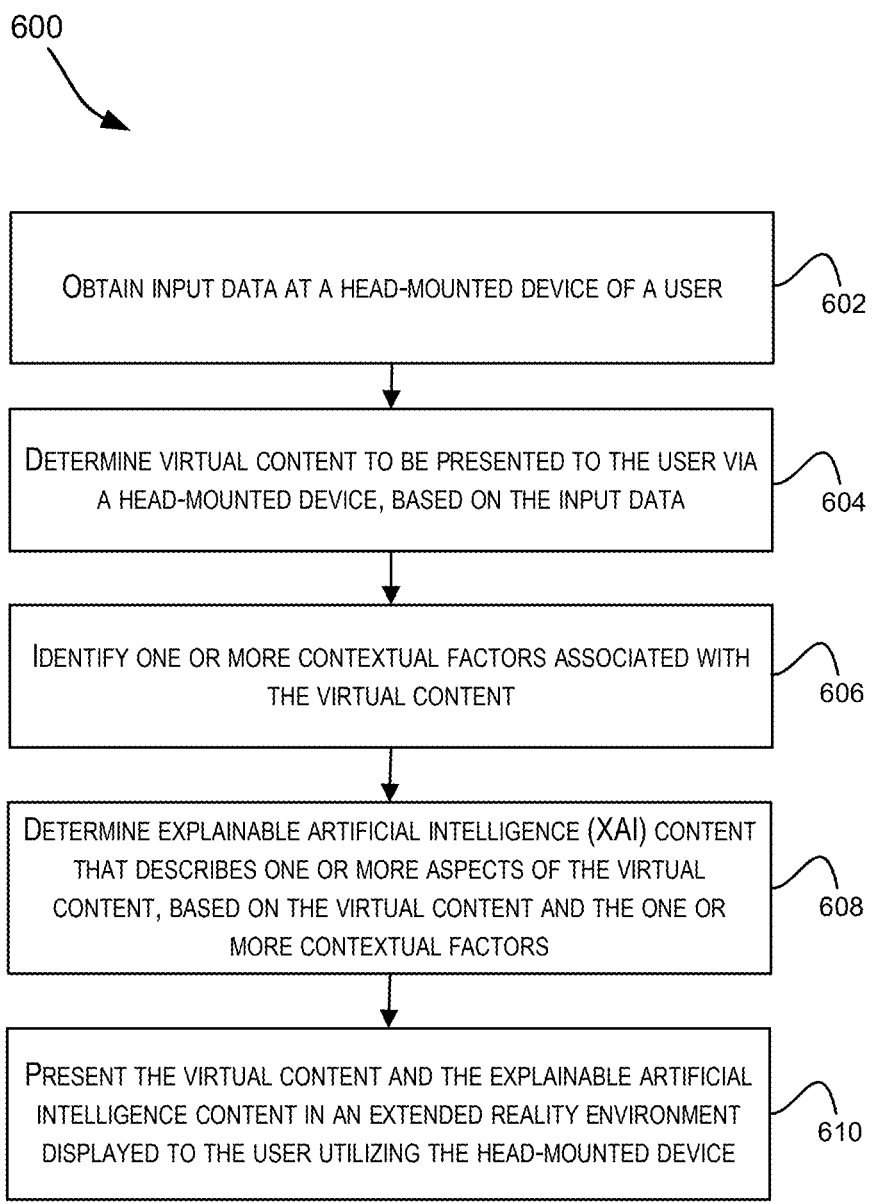

OBTAIN INPUT DATA AT A HEAD-MOUNTED DEVICE OF A USER          602

DETERMINE VIRTUAL CONTENT TO BE PRESENTED TO THE USER VIA
A HEAD-MOUNTED DEVICE, BASED ON THE INPUT DATA          604

IDENTIFY ONE OR MORE CONTEXTUAL FACTORS ASSOCIATED WITH
THE VIRTUAL CONTENT          606

DETERMINE EXPLAINABLE ARTIFICIAL INTELLIGENCE (XAI) CONTENT
THAT DESCRIBES ONE OR MORE ASPECTS OF THE VIRTUAL
CONTENT, BASED ON THE VIRTUAL CONTENT AND THE ONE OR
MORE CONTEXTUAL FACTORS          608

PRESENT THE VIRTUAL CONTENT AND THE EXPLAINABLE ARTIFICIAL
INTELLIGENCE CONTENT IN AN EXTENDED REALITY ENVIRONMENT
DISPLAYED TO THE USER UTILIZING THE HEAD-MOUNTED DEVICE          610

*FIG. 6*

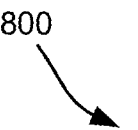

800

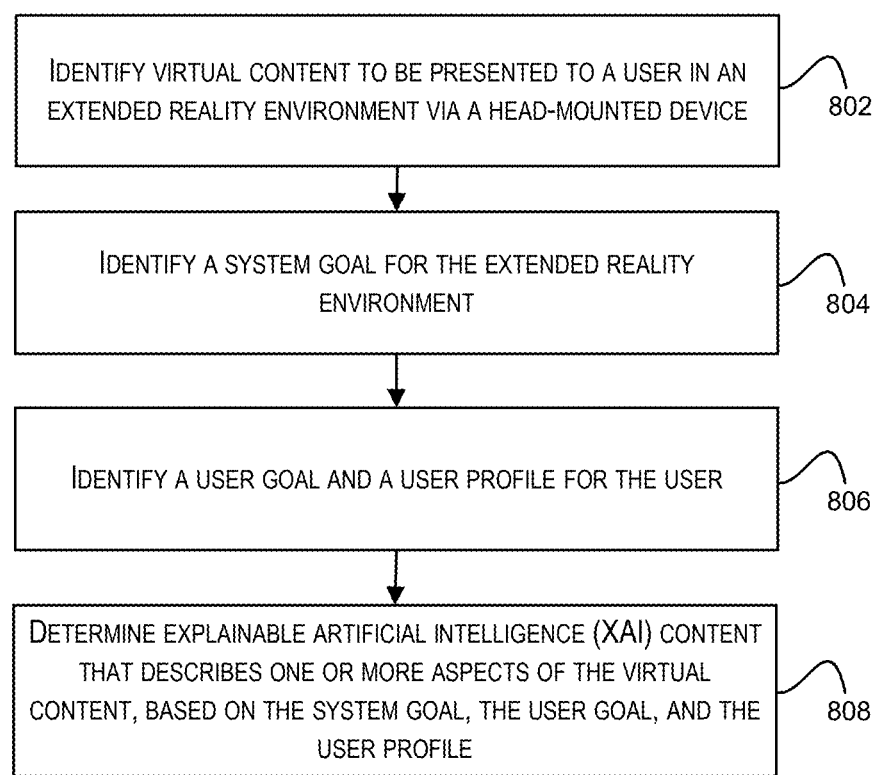

IDENTIFY VIRTUAL CONTENT TO BE PRESENTED TO A USER IN AN EXTENDED REALITY ENVIRONMENT VIA A HEAD-MOUNTED DEVICE — 802

IDENTIFY A SYSTEM GOAL FOR THE EXTENDED REALITY ENVIRONMENT — 804

IDENTIFY A USER GOAL AND A USER PROFILE FOR THE USER — 806

DETERMINE EXPLAINABLE ARTIFICIAL INTELLIGENCE (XAI) CONTENT THAT DESCRIBES ONE OR MORE ASPECTS OF THE VIRTUAL CONTENT, BASED ON THE SYSTEM GOAL, THE USER GOAL, AND THE USER PROFILE — 808

SYSTEM AND METHOD FOR PROVIDING EXPLAINABLE ARTIFICIAL INTELLIGENCE WITHIN EXTENDED REALITY

CROSS-REFERENCE TO RELATED APPLICATIONS

The present disclosure claims priority to U.S. Provisional Application Ser. No. 63/375,016 for "Framework Of Explainable Ai In Extended Reality," filed Sep. 8, 2022, which is incorporated by reference herein in its entirety.

FIELD

The present disclosure generally relates to extended reality environments, and more particularly, to techniques for providing explainable artificial intelligence (i.e., an explanation as to how and/or why artificial intelligence-generated content was provided to a user) within extended reality.

BACKGROUND

Extended reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated virtual content or generated virtual content combined with physical content (e.g., physical or real-world objects). The extended reality content may include digital images or animation, text, video, audio, haptic feedback, or some combination thereof, and any of which may be presented in a single channel or in multiple channels (such as stereo video that produces a three-dimensional effect to the viewer). Extended reality may be associated with applications, products, accessories, services, or some combination thereof, that are, e.g., used to create content in an extended reality and/or used in (e.g., perform activities in) an extended reality. The extended reality system that provides such content may be implemented on various platforms, including a head-mounted display (HMD) connected to a host computer system, a standalone HMD, a mobile device or computing system, or any other hardware platform capable of providing extended reality content to one or more viewers.

BRIEF SUMMARY

Embodiments described herein pertain to a system and method for providing explainable artificial intelligence within extended reality.

In some implementations, an extended reality system is provided that includes a head-mounted device that has a display for displaying content to a user and one or more sensors to capture input data including images of a visual field of the user; one or more processors; and one or more memories that are accessible to the one or more processors and that store instructions that are executable by the one or more processors and, when executed by the one or more processors, cause the one or more processors to perform processing including obtaining input data at the head-mounted device of the user; determining virtual content to be presented to a user via the head-mounted device, based on the input data; identifying one or more contextual factors associated with the virtual content; determining explainable artificial intelligence (XAI) content that describes one or more aspects of the virtual content, based on the virtual content and the one or more contextual factors; and presenting the virtual content and the explainable artificial intelligence content in an extended reality environment displayed to the user utilizing the head-mounted device.

In some implementations, the input data includes environmental information that describes a current environment of the user, user state information that describes a current state of the user, and user profile information that describes one or more preferences of the user. In other implementations, determining the virtual content to be presented to the user via the head-mounted device includes providing the input data as input into one or more trained machine learning/artificial intelligence environments; and retrieving, from the one or more trained machine learning/artificial intelligence environments, the virtual content. In other implementations, the one or more contextual factors associated with the virtual content include: one or more system goals, one or more user goals, and one or more components of a user profile.

Some implementations of the present disclosure include a system including one or more data processors and a non-transitory computer readable storage medium containing instructions which, when executed on the one or more data processors, cause the one or more data processors to perform part or all of one or more methods and/or part or all of one or more processes disclosed herein.

Some implementations of the present disclosure also include one or more non-transitory computer-readable media storing computer-readable instructions that, when executed by one or more processing systems, cause the one or more processing systems to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 is an illustration of a flowchart of an example process for providing explainable artificial intelligence within extended reality in accordance with various embodiments.

FIG. 8 is an illustration of a flowchart of an example process for providing explainable artificial intelligence within extended reality based on a system goal, a user goal, and a user profile, in accordance with various embodiments.

DETAILED DESCRIPTION

Figure 1:
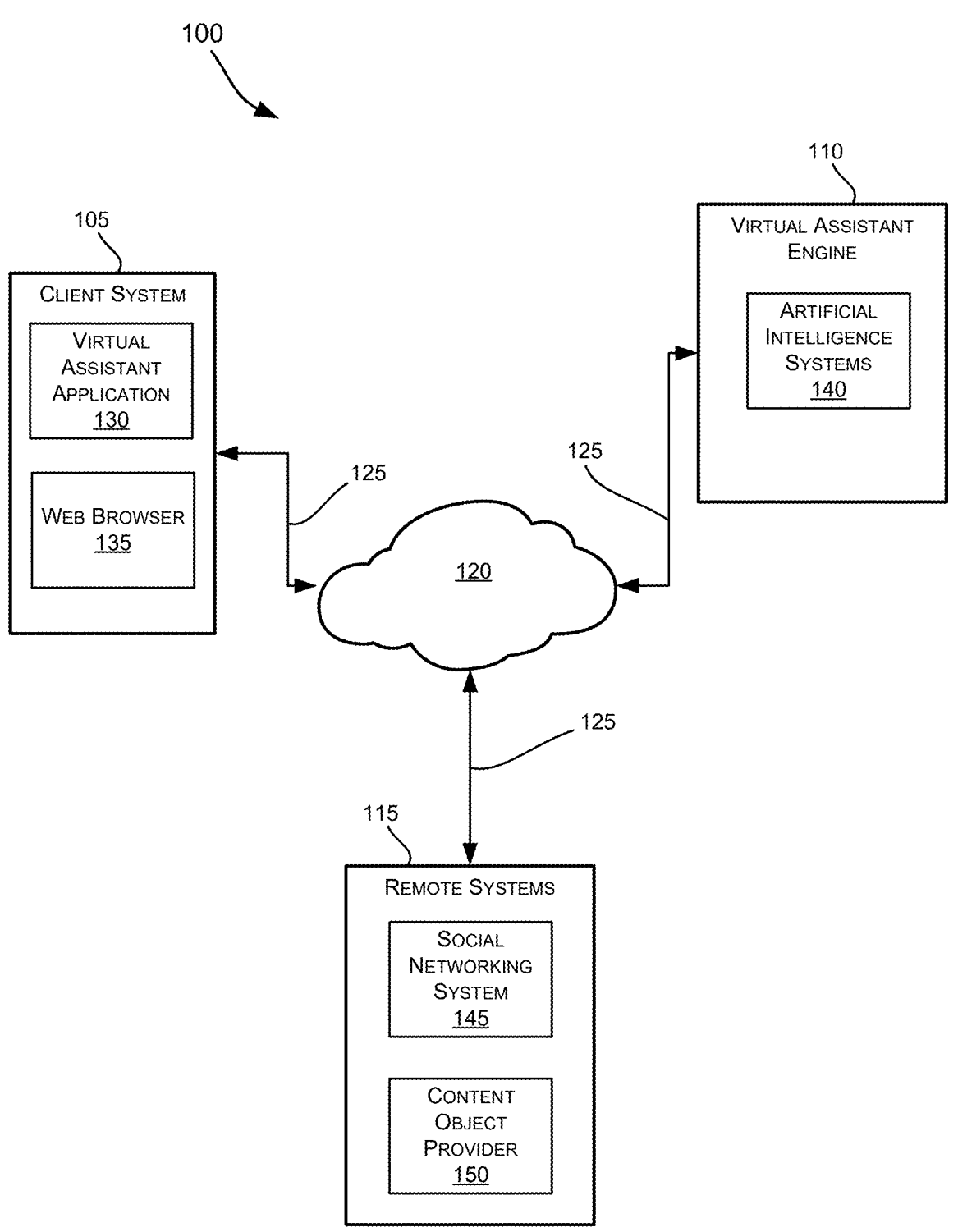
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Extended reality systems are becoming increasingly ubiquitous with applications in many fields, such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a head-mounted device (HMD) worn by a user and configured to output extended reality content to the user. The extended reality content may be generated in a wholly or partially simulated environment (extended reality environment) that people sense and/or interact with via an electronic system. The simulated environment may be a virtual reality (VR) environment, which is designed to be based entirely on computer-generated sensory inputs (e.g., virtual content) for one or more user senses, or a mixed reality (MR) environment, which is designed to incorporate sensory inputs (e.g., a view of the physical surroundings) from the physical environment, or a representation thereof, in addition to including computer-generated sensory inputs (e.g., virtual content). Examples of MR include augmented reality (AR) and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment is a simulated environment in which a virtual or computer-generated environment incorporates one or more sensory inputs from the physical environment. In any instance, during operation in a VR, MR, AR, or AV environment, the user typically interacts with and within the extended reality system to interact with extended reality content.

Extended reality systems can be used to facilitate interactions amongst users and objects within the virtual and/or physical world. Content provided via these extended reality systems may include artificial intelligence (AI) generated content. The reasoning and methodology behind this AI generated content may not be visible to users receiving such content, which may hinder a user's understanding of such content (or a user's understanding of why such content was provided to the user). As a result, users may disable or disregard AI content that could prove beneficial to their extended reality experience.

In order overcome these challenges and others, the technique of providing explainable artificial intelligence (XAI) was developed for extended reality systems. After obtaining input data, including environmental information, user state information, and user profile information, an extended reality system determines virtual content to be presented to a user via a head-mounted device. The extended reality system also identified additional contextual factors associated with this virtual content, including system goals, user goals, a current state of the user, a user's location, a current time, and a current environment of the user. These additional contextual details are then used to determine XAI content that describes one or more aspects of the virtual content (such as how the virtual content was determined based on the input data). The virtual content and the XAI content are then presented to the user by the extended reality system.

In an exemplary embodiment, an extended reality system is provided that includes a head-mounted device that has a display for displaying content to a user and one or more sensors to capture input data including images of a visual field of the user; one or more processors; and one or more memories that are accessible to the one or more processors and that store instructions that are executable by the one or more processors and, when executed by the one or more processors, cause the one or more processors to perform processing including obtaining input data at the head-mounted device of the user; determining virtual content to be presented to a user via the head-mounted device, based on the input data; identifying one or more contextual factors associated with the virtual content; determining explainable artificial intelligence (XAI) content that describes one or more aspects of the virtual content, based on the virtual content and the one or more contextual factors; and presenting the virtual content and the explainable artificial intelligence content in an extended reality environment displayed to the user utilizing the head-mounted device.

Extended Reality System Overview

FIG. 1 illustrates an example network environment 100 associated with an extended reality system in accordance with aspects of the present disclosure. Network environment 100 includes a client system 105, a virtual assistant engine 110, and remote systems 115 connected to each other by a network 120. Although FIG. 1 illustrates a particular arrangement of the client system 105, the virtual assistant engine 110, the remote systems 115, and the network 120, this disclosure contemplates any suitable arrangement. As an example, and not by way of limitation, two or more of the client system 105, the virtual assistant engine 110, and the remote systems 115 may be connected to each other directly, bypassing the network 120. As another example, two or more of the client system 105, the virtual assistant engine 110, and the remote systems 115 may be physically or logically co-located with each other in whole or in part. Moreover, although FIG. 1 illustrates a particular number of the client system 105, the virtual assistant engine 110, the remote systems 115, and the network 120, this disclosure contemplates any suitable number of client systems 105, virtual assistant engine 110, remote systems 115, and networks 120. As an example, and not by way of limitation, network environment 100 may include multiple client systems, such as client system 105; virtual assistant engines, such as virtual assistant engine 110; remote systems, such as remote systems 115; and networks, such as network 120.

This disclosure contemplates that network 120 may be any suitable network. As an example, and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Additionally, the network 120 may include one or more networks.

Links 125 may connect the client system 105, the virtual assistant engine 110, and the remote systems 115 to the network 120, to another communication network (not shown), or to each other. This disclosure contemplates links 125 may include any number and type of suitable links. In particular embodiments, one or more of the links 125 include one or more wireline links (e.g., Digital Subscriber Line or Data Over Cable Service Interface Specification), wireless links (e.g., Wi-Fi or Worldwide Interoperability for Microwave Access), or optical links (e.g., Synchronous Optical Network or Synchronous Digital Hierarchy). In particular embodiments, each link of the links 125 includes an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links. Links 125 need not necessarily be the same throughout a network environment 100. For example, some links of the links 125 may differ in one or more respects from some other links of the links 125.

In various embodiments, the client system 105 is an electronic device including hardware, software, or embedded logic components or a combination of two or more such components and capable of carrying out the appropriate extended reality functionalities in accordance with techniques of the disclosure. As an example, and not by way of limitation, the client system 105 may include a desktop computer, notebook or laptop computer, netbook, a tablet computer, e-book reader, global positioning system (GPS) device, camera, personal digital assistant, handheld electronic device, cellular telephone, smartphone, a VR, MR, AR, or AV headset or HMD, any suitable electronic device capable of displaying extended reality content, or any suitable combination thereof. In particular embodiments, the client system 105 is a VR/AR HMD, such as described in detail with respect to FIG. 2. This disclosure contemplates any suitable client system 105 that is configured to generate and output extended reality content to the user. The client system 105 may enable its user to communicate with other users at other client systems.

In various embodiments, the client system 105 includes a virtual assistant application 130. The virtual assistant application 130 instantiates at least a portion of a virtual assistant, which can provide information or services to a user based on user input, contextual awareness (such as clues from the physical environment or clues from user behavior), and the capability to access information from a variety of online sources (such as weather conditions, traffic information, news, stock prices, user schedules, and/or retail prices). As used herein, when an action is "based on" something, this means the action is based at least in part on at least a part of the something. The user input may include text (e.g., online chat), especially in an instant messaging application or other applications, voice, eye-tracking, user motion, such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), provide goal assisted services (e.g., generating and implementing a recipe to cook a meal in a certain amount of time, implementing tasks to clean in a most efficient manner, generating and executing a construction plan including allocation of tasks to two or more workers, and the like), or combinations thereof. The virtual assistant may also perform management or data-handling tasks based on online information and events without user initiation or interaction. Examples of those tasks that may be performed by the virtual assistant may include schedule management (e.g., sending an alert to a dinner date to which a user is running late due to traffic conditions, updating schedules for both parties, and changing the restaurant reservation time). The virtual assistant may be enabled in an extended reality environment by a combination of the client system 105, the virtual assistant engine 110, application programming interfaces (APIs), and the proliferation of applications on user devices, such as the remote systems 115.

A user at the client system 105 may use the virtual assistant application 130 to interact with the virtual assistant engine 110. In some instances, the virtual assistant application 130 is a stand-alone application or integrated into another application, such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and watches interactions of the user in the real-world, and processes what it hears and sees (e.g., explicit input, such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, and/or sensors. The virtual assistant application 130 communicates the input to the virtual assistant engine 110. Based on the input, the virtual assistant engine 110 analyzes the input and generates responses (e.g., text or audio responses, device commands, such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities, such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via remote systems 115). The virtual assistant application 130 may communicate the request for traffic information to virtual assistant engine 110. The virtual assistant engine 110 may accordingly contact a third-party system and retrieve traffic information as a result of the request and send the traffic information back to the virtual assistant application 110. The virtual assistant application 110 may then present the traffic information to the user as text (e.g., as virtual content overlaid on the physical environment, such as real-world object) or audio (e.g., spoken to the user in natural language through a speaker associated with the client system 105).

In some embodiments, the client system 105 may collect or otherwise be associated with data. In some embodiments, the data may be collected from or pertain to any suitable computing system or application (e.g., a social-networking system, other client systems, a third-party system, a messaging application, a photo-sharing application, a biometric data acquisition application, an artificial-reality application, a virtual assistant application).

In some embodiments, privacy settings (or "access settings") may be provided for the data. The privacy settings may be stored in any suitable manner (e.g., stored in an index on an authorization server). A privacy setting for the data may specify how the data or particular information associated with the data can be accessed, stored, or otherwise used (e.g., viewed, shared, modified, copied, executed, surfaced, or identified) within an application (e.g., an extended reality application). When the privacy settings for the data allow a particular user or other entity to access that the data, the data may be described as being "visible" with respect to that user or other entity. For example, a user of an extended reality application or virtual assistant application may specify privacy settings for a user profile page that identifies a set of users that may access the extended reality application or virtual assistant application information on the user profile page and excludes other users from accessing that information. As another example, an extended reality application or virtual assistant application may store privacy policies/guidelines. The privacy policies/guidelines may specify what information of users may be accessible by which entities and/or by which processes (e.g., internal research, advertising algorithms, machine-learning algorithms) to ensure only certain information of the user may be accessed by certain entities or processes.

In some embodiments, privacy settings for the data may specify a "blocked list" of users or other entities that should not be allowed to access certain information associated with the data. In some cases, the blocked list may include third-party entities. The blocked list may specify one or more users or entities for which the data is not visible.

In some embodiments, privacy settings associated with the data may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different pieces of the data of the same type associated with a user may have different privacy settings. In addition, one or more default privacy settings may be set for each piece of data of a particular data type.

In various embodiments, the virtual assistant engine 110 assists users to retrieve information from different sources, request services from different service providers, assist users to learn or complete goals and tasks using different sources and/or service providers, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with goals or tasks associated with the user. Goals may include things that a user wants to occur or desires (e.g., as a meal, a piece of furniture, a repaired automobile, a house, a garden, a clean apartment, and the like). Tasks may include things that need to be done or activities that should be carried out in order to accomplish a goal or carry out an aim (e.g., cooking a meal using one or more recipes, building a piece of furniture, repairing a vehicle, building a house, planting a garden, cleaning one or more rooms of an apartment, and the like). Each goal and task may be associated with a workflow of actions or sub-tasks for performing the task and achieving the goal. For example, for preparing a salad, a workflow of actions or sub-tasks may include ingredients needed, any equipment needed for the steps (e.g., a knife, a stove top, a pan, a salad spinner), sub-tasks for preparing ingredients (e.g., chopping onions, cleaning lettuce, cooking chicken), and sub-tasks for combining ingredients into subcomponents (e.g., cooking chicken with olive oil and Italian seasonings).

The virtual assistant engine 110 may use AI systems 140 (e.g., rule-based systems or machine-learning based systems, such as natural-language understanding models) to analyze the input based on a user's profile and other relevant information. The result of the analysis may include different interactions associated with a task or goal of the user. The virtual assistant engine 110 may then retrieve information, request services, and/or generate instructions, recommendations, or virtual content associated with one or more of the different interactions for completing tasks or goals. In some instances, the virtual assistant engine 110 interacts with remote systems 115, such as a social-networking system 145 when retrieving information, requesting service, and/or generating instructions or recommendations for the user. The virtual assistant engine 110 may generate virtual content for the user using various techniques, such as natural language generating, virtual object rendering, and the like. The virtual content may include, for example, the retrieved information; the status of the requested services; a virtual object, such as a glimmer overlaid on a physical object such as an appliance, light, or piece of exercise equipment; a demonstration for a task, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques. The functionality of the virtual assistant engine 110 is described in more detail with respect to FIGS. 5-7.

In various embodiments, remote systems 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party systems may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as user-profile data, concept-profile data, social-graph information, or other suitable data related to the online social network. The social-networking system 145 may be accessed by the other components of network environment 100 either directly or via a network 120. As an example, and not by way of limitation, the client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system via the network 120.

Remote systems 115 may include a content object provider 150. A content object provider 150 includes one or more sources of virtual content objects, which may be communicated to the client system 105. As an example, and not by way of limitation, virtual content objects may include information regarding things or activities of interest to the user, such as movie show times, movie reviews, restaurant reviews, restaurant menus, product information and reviews, instructions on how to perform various tasks, exercise regimens, cooking recipes, or other suitable information. As another example and not by way of limitation, content objects may include incentive content objects, such as coupons, discount tickets, gift certificates, or other suitable incentive objects. As another example and not by way of limitation, content objects may include virtual objects, such as virtual interfaces, two-dimensional (2D) or three-dimensional (3D) graphics, media content, or other suitable virtual objects.

Figure 2A:
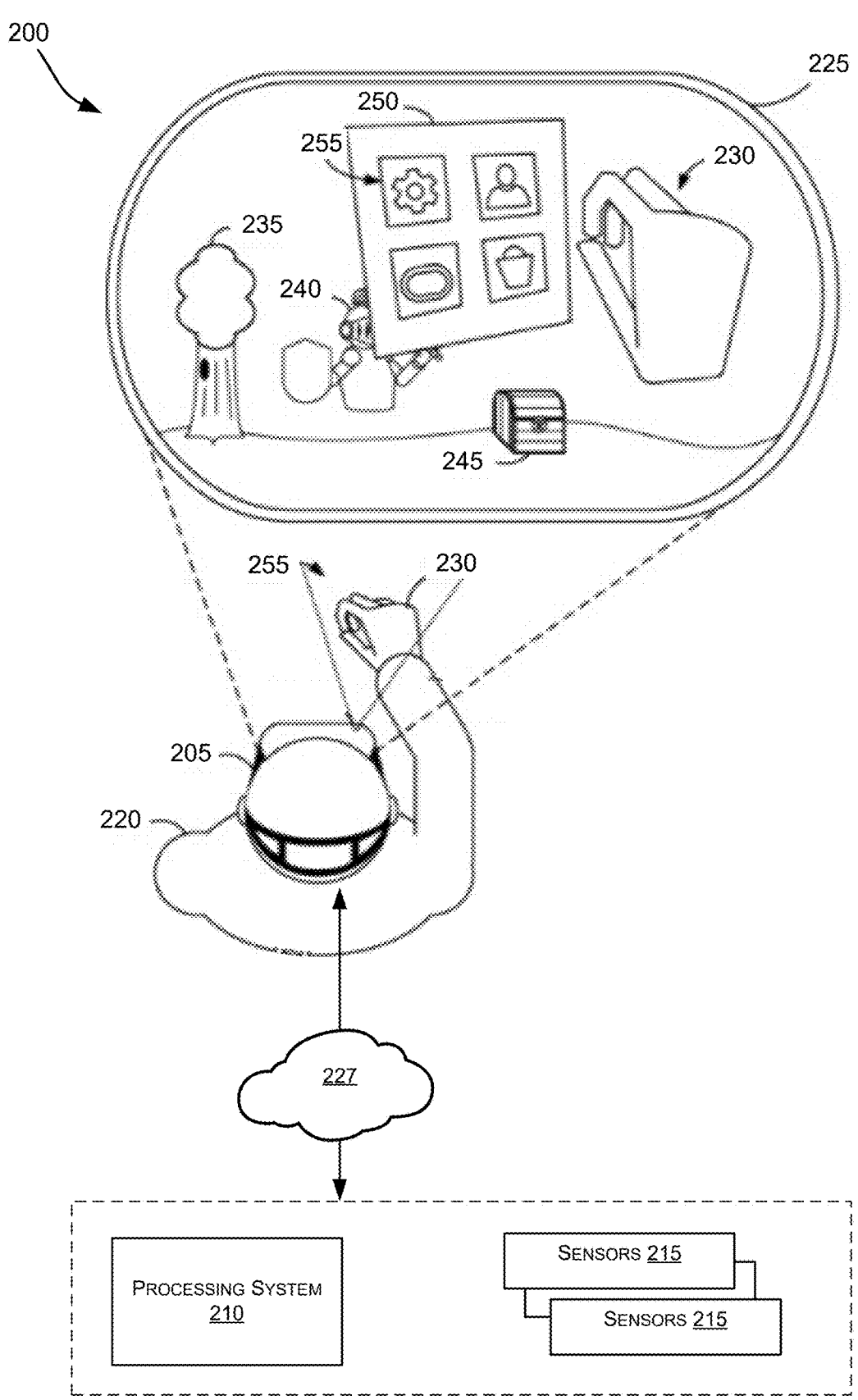
FIG. 2A is an illustration depicting an example extended reality system that presents and controls user interface elements within an extended reality environment in accordance with various embodiments.

FIG. 2A illustrates an example client system 200 (e.g., client system 105 described with respect to FIG. 1) in accordance with aspects of the present disclosure. Client system 200 includes an extended reality system 205 (e.g., an HMD), a processing system 210, and one or more sensors 215. As shown, extended reality system 205 is typically worn by user 220 and includes an electronic display (e.g., a transparent, translucent, or solid display), optional controllers, and optical assembly for presenting extended reality content 225 to the user 220. The one or more sensors 215 may include motion sensors (e.g., accelerometers) for tracking motion of the extended reality system 205 and may include one or more image capturing devices (e.g., cameras, line scanners) for capturing images and other information of the surrounding physical environment. In this example, processing system 210 is shown as a single computing device, such as a gaming console, workstation, a desktop computer, or a laptop. In other examples, processing system 210 may be distributed across a plurality of computing devices, such as a distributed computing network, a data center, or a cloud computing system. In other examples, processing system 210 may be integrated with the HMD. Extended reality system 205, processing system 210, and the one or more sensors 215 are communicatively coupled via a network 227, which may be a wired or wireless network, such as Wi-Fi, a mesh network, or a short-range wireless communication medium, such as Bluetooth wireless technology, or a combination thereof. Although extended reality system 205 is shown in this example as in communication with, e.g., tethered to or in wireless communication with, the processing system 210, in some implementations, extended reality system 205 operates as a stand-alone, mobile extended reality system.

In general, client system 200 uses information captured from a real-world, physical environment to render extended reality content 225 for display to the user 220. In the example of FIG. 2, the user 220 views the extended reality content 225 constructed and rendered by an extended reality application executing on processing system 210 and/or extended reality system 205. In some examples, the extended reality content 225 viewed through the extended reality system 205 includes a mixture of real-world imagery (e.g., the user's hand 230 and physical objects 235) and virtual imagery (e.g., virtual content, such as information or objects 240, 245 and virtual user interface 250) to produce mixed reality and/or augmented reality. In some examples, virtual information or objects 240, 245 may be mapped (e.g., pinned, locked, placed) to a particular position within extended reality content 225. For example, a position for virtual information or objects 240, 245 may be fixed, as relative to one of walls of a residence or surface of the earth, for instance. A position for virtual information or objects 240, 245 may be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content, such as information or objects 240, 245 and virtual user interface 250) does not exist in the real-world, physical environment. Virtual user interface 250 may be fixed, as relative to the user 220, the user's hand 230, physical objects 235, or other virtual content, such as virtual information or objects 240, 245, for instance. As a result, client system 200 renders, at a user interface position that is locked relative to a position of the user 220, the user's hand 230, physical objects 235, or other virtual content in the extended reality environment, virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall, table, or ceiling). In the example shown in FIG. 2A, the virtual surface is associated with the sky and ground of the physical environment. In other examples, a virtual surface can be associated with a portion of a surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, client system 200 may render virtual user interface 250 only if a given physical object (e.g., a lamp) is within the field of view of the user 220.

During operation, the extended reality application constructs extended reality content 225 for display to user 220 by tracking and computing interaction information (e.g., tasks for completion) for a frame of reference, typically a viewing perspective of extended reality system 205. Using extended reality system 205 as a frame of reference and based on a current field of view as determined by a current estimated interaction of extended reality system 205, the extended reality application renders extended reality content 225 which, in some examples, may be overlaid, at least in part, upon the real-world, physical environment of the user 220. During this process, the extended reality application uses sensed data received from extended reality system 205 and sensors 215, such as movement information, contextual awareness, and/or user commands, and, in some examples, data from any external sensors, such as third-party information or device, to capture information within the real world, physical environment, such as motion by user 220 and/or feature tracking information with respect to user 220. Based on the sensed data, the extended reality application determines interaction information to be presented for the frame of reference of extended reality system 205 and, in accordance with the current context of the user 220, renders the extended reality content 225.

Client system 200 may trigger generation and rendering of virtual content based on a current field of view of user 220, as may be determined by real-time gaze 265 tracking of the user, or other conditions. More specifically, image capture devices of the sensors 215 capture image data representative of objects in the real-world, physical environment that are within a field of view of image capture devices. During operation, the client system 200 performs object recognition within images captured by the image capturing devices of extended reality system 205 to identify objects in the physical environment, such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 that includes mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, or physical objects 235, that are within a field of view of the user 220. In other examples, the extended reality application may render images of real-world objects, such as the portions of the user 220, the user's hand 230, or physical objects 235, that are within a field of view along with virtual objects, such as virtual information or objects 240, 245 within extended reality content 225. In other examples, the extended reality application may render virtual representations of the portions of the user 220, the user's hand 230, and physical objects 235 that are within a field of view (e.g., render real-world objects as virtual objects) within extended reality content 225. In either example, user 220 is able to view the portions of the user 220, the user's hand 230, physical objects 235 and/or any other real-world objects or virtual content that are within a field of view within extended reality content 225. In other examples, the extended reality application may not render representations of the user 220 and the user's hand 230; the extended reality application may instead only render the physical objects 235 and/or virtual information or objects 240, 245.

In various embodiments, the client system 200 renders to extended reality system 205 extended reality content 225 in which virtual user interface 250 is locked relative to a position of the user 220, the user's hand 230, physical objects 235, or other virtual content in the extended reality environment. That is, the client system 205 may render a virtual user interface 250 having one or more virtual user interface elements at a position and orientation that are based on and correspond to the position and orientation of the user 220, the user's hand 230, physical objects 235, or other virtual content in the extended reality environment. For example, if a physical object is positioned in a vertical position on a table, the client system 205 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, physical objects 235, or other virtual content such that the user interface appears, to the user, to be associated with the user 220, the user's hand 230, physical objects 235, or other virtual content in the extended reality environment.

Figure 2B:
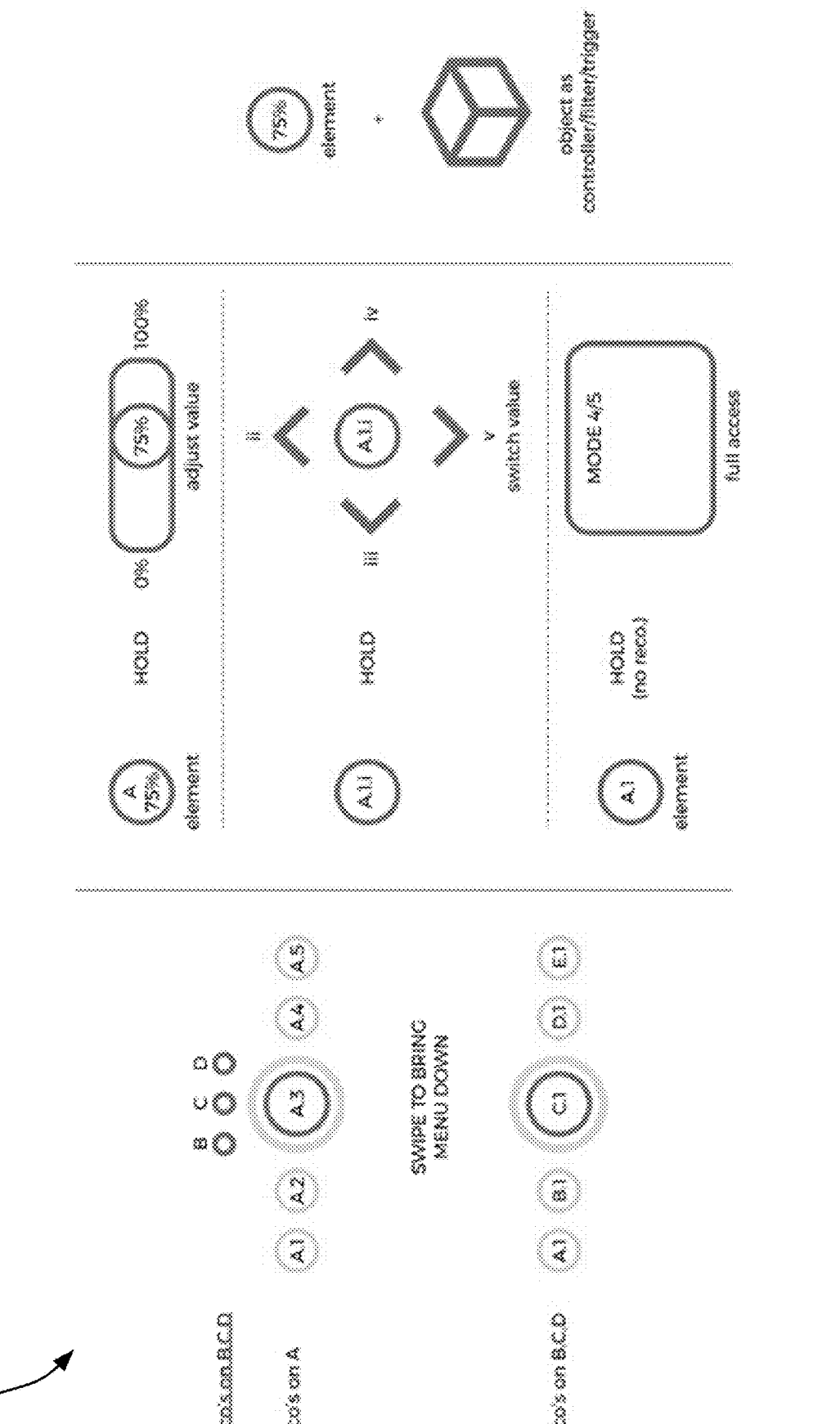
FIG. 2B is an illustration depicting user interface elements in accordance with various embodiments.

As shown in FIGS. 2A and 2B, virtual user interface 250 includes one or more virtual user interface elements. Virtual user interface elements may include, for instance, a virtual drawing interface; a selectable menu (e.g., a drop-down menu); virtual buttons, such as button element 255; a virtual slider or scroll bar; a directional pad; a keyboard; other user-selectable user interface elements including glyphs, display elements, content, user interface controls, and so forth. The particular virtual user interface elements for virtual user interface 250 may be context-driven based on the current extended reality applications engaged by the user 220 or real-world actions/tasks being performed by the user 220. When a user performs a user interface gesture in the extended reality environment at a location that corresponds to one of the virtual user interface elements of virtual user interface 250, the client system 200 detects the gesture relative to the virtual user interface elements and performs an action associated with the gesture and the virtual user interface elements. For example, the user 220 may press their finger at a button element 255 location on the virtual user interface 250. The button element 255 and/or virtual user interface 250 location may or may not be overlaid on the user 220, the user's hand 230, physical objects 235, or other virtual content, e.g., correspond to a position in the physical environment, such as on a light switch or controller at which the client system 200 renders the virtual user interface button. In this example, the client system 200 detects this virtual button press gesture and performs an action corresponding to the detected press of a virtual user interface button (e.g., turns the light on). The client system 205 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, extended reality system 205 and/or controller may output a vibration or "click" noise, or extended reality system 205 and/or controller may generate and output content to a display. In some examples, the user 220 may press and drag their finger along physical locations on the extended reality system 205 and/or controller corresponding to positions in the virtual environment at which the client system 205 renders virtual user interface elements of virtual user interface 250. In this example, the client system 205 detects this gesture and performs an action according to the detected press and drag of virtual user interface elements, such as by moving a slider bar in the virtual environment. In this way, client system 200 simulates movement of virtual content using virtual user interface elements and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (e.g., stereo video that produces a 3D effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (e.g., augmented reality system 300 in FIG. 3A) or that visually immerses a user in an extended reality (e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
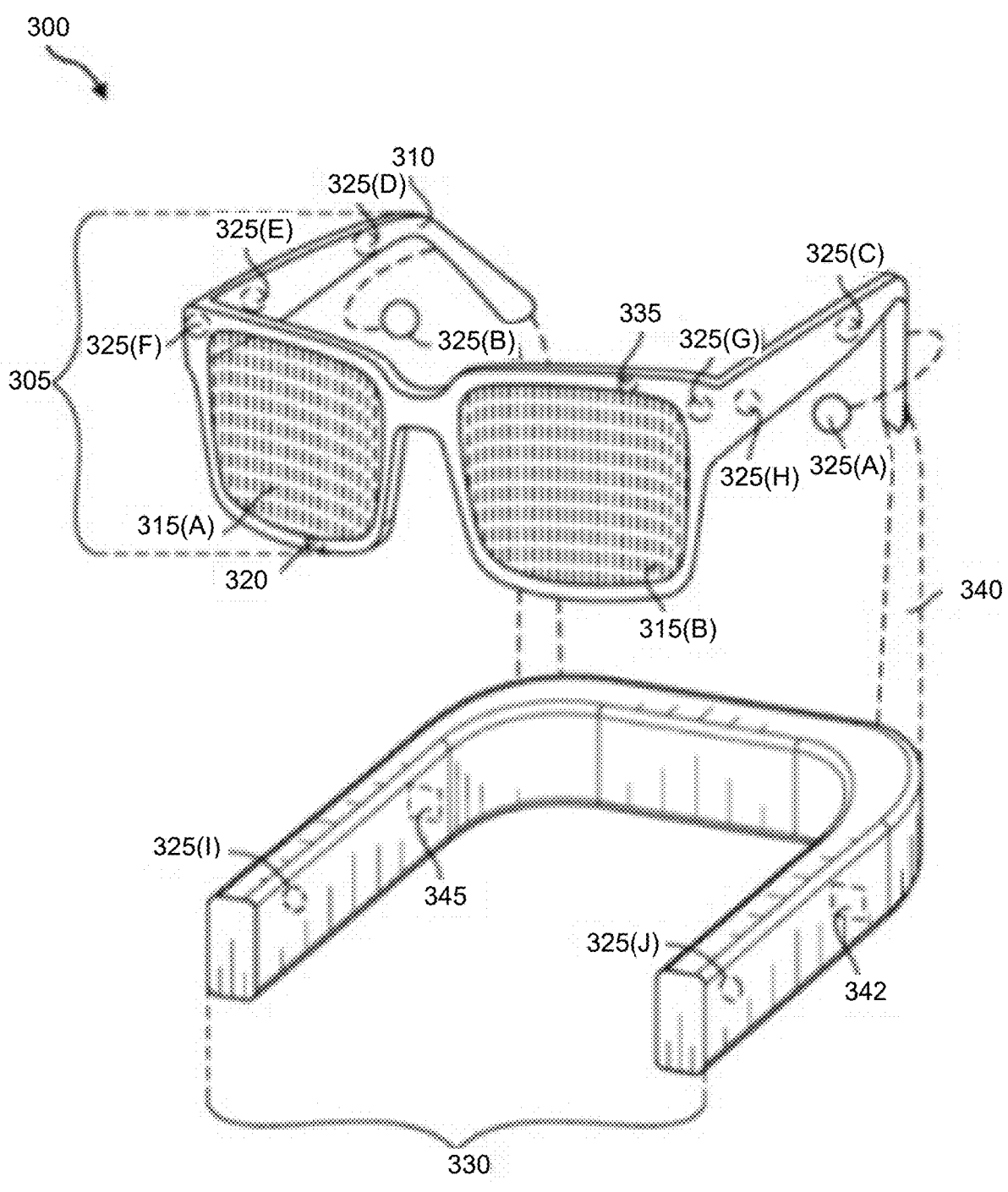
FIG. 3A is an illustration of an augmented reality system in accordance with various embodiments.

As shown in FIG. 3A, augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, augmented reality system 300 may include one or more sensors, such as sensor 320. Sensor 320 may generate measurement signals in response to motion of augmented reality system 300 and may be located on substantially any portion of frame 310. Sensor 320 may represent one or more of a variety of different sensing mechanisms, such as a position sensor, an inertial measurement unit (IMU), a depth camera assembly, a structured light emitter and/or detector, or any combination thereof. In some embodiments, augmented reality system 300 may or may not include sensor 320 or may include more than one sensor. In embodiments in which sensor 320 includes an IMU, the IMU may generate calibration data based on measurement signals from sensor 320. Examples of sensor 320 may include, without limitation, accelerometers, gyroscopes, magnetometers, other suitable types of sensors that detect motion, sensors used for error correction of the IMU, or some combination thereof.

In some examples, augmented reality system 300 may also include a microphone array with a plurality of acoustic transducers 325(A)-325(J), referred to collectively as acoustic transducers 325. Acoustic transducers 325 may represent transducers that detect air pressure variations induced by sound waves. Each acoustic transducer 325 may be configured to detect sound and convert the detected sound into an electronic format (e.g., an analog or digital format). The microphone array in FIG. 3A may include, for example, ten acoustic transducers: 325(A) and 325(B), which may be designed to be placed inside a corresponding ear of the user, acoustic transducers 325(C), 325(D), 325(E), 325(F), 325(G), and 325(H), which may be positioned at various locations on frame 310, and/or acoustic transducers 325(I) and 325(J), which may be positioned on a corresponding neckband 330.

In some embodiments, one or more of acoustic transducers 325(A)-(J) may be used as output transducers (e.g., speakers). For example, acoustic transducers 325(A) and/or 325(B) may be earbuds or any other suitable type of headphone or speaker. The configuration of acoustic transducers 325 of the microphone array may vary. While augmented reality system 300 is shown in FIG. 3A as having ten acoustic transducers, the number of acoustic transducers 325 may be greater or less than ten. In some embodiments, using higher numbers of acoustic transducers 325 may increase the amount of audio information collected and/or the sensitivity and accuracy of the audio information. In contrast, using a lower number of acoustic transducers 325 may decrease the computing power required by an associated controller 335 to process the collected audio information. In addition, the position of each acoustic transducer 325 of the microphone array may vary. For example, the position of an acoustic transducer 325 may include a defined position on the user, a defined coordinate on frame 310, an orientation associated with each acoustic transducer 325, or some combination thereof.

Acoustic transducers 325(A) and 325(B) may be positioned on different parts of the user's ear, such as behind the pinna, behind the tragus, and/or within the auricle or fossa. Alternatively, or additionally, there may be additional acoustic transducers 325 on or surrounding the ear in addition to acoustic transducers 325 inside the ear canal. Having an acoustic transducer 325 positioned next to an ear canal of a user may enable the microphone array to collect information on how sounds arrive at the ear canal. By positioning at least two of acoustic transducers 325 on either side of a user's head (e.g., as binaural microphones), augmented reality system 300 may simulate binaural hearing and capture a 3D stereo sound field around a user's head. In some embodiments, acoustic transducers 325(A) and 325(B) may be connected to augmented reality system 300 via a wired connection 340, and in other embodiments acoustic transducers 325(A) and 325(B) may be connected to augmented reality system 300 via a wireless connection (e.g., a Bluetooth connection). In still other embodiments, acoustic transducers 325(A) and 325(B) may not be used at all in conjunction with augmented reality system 300.

Acoustic transducers 325 on frame 310 may be positioned in a variety of different ways, including along the length of the temples, across the bridge, above or below display devices 315(A) and 315(B), or some combination thereof. Acoustic transducers 325 may also be oriented such that the microphone array is able to detect sounds in a wide range of directions surrounding the user wearing the augmented reality system 300. In some embodiments, an optimization process may be performed during manufacturing of augmented reality system 300 to determine relative positioning of each acoustic transducer 325 in the microphone array.

In some examples, augmented reality system 300 may include or be connected to an external device (e.g., a paired device), such as neckband 330. Neckband 330 generally represents any type or form of paired device. Thus, the following discussion of neckband 330 may also apply to various other paired devices, such as charging cases, smart watches, smart phones, wrist bands, other wearable devices, hand-held controllers, tablet computers, laptop computers, and/or other external computing devices.

As shown, neckband 330 may be coupled to eyewear device 305 via one or more connectors. The connectors may be wired or wireless and may include electrical and/or non-electrical (e.g., structural) components. In some cases, eyewear device 305 and neckband 330 may operate independently without any wired or wireless connection between them. While FIG. 3A illustrates the components of eyewear device 305 and neckband 330 in example locations on eyewear device 305 and neckband 330, the components may be located elsewhere and/or distributed differently on eyewear device 305 and/or neckband 330. In some embodiments, the components of eyewear device 305 and neckband 330 may be located on one or more additional peripheral devices paired with eyewear device 305, neckband 330, or some combination thereof.

Pairing external devices, such as neckband 330, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 300 may be provided by a paired device or shared between a paired device and an eyewear device, thus reducing the weight, heat profile, and form factor of the eyewear device overall while still retaining desired functionality. For example, neckband 330 may allow components that would otherwise be included on an eyewear device to be included in neckband 330 since users may tolerate a heavier weight load on their shoulders than they would tolerate on their heads. Neckband 330 may also have a larger surface area over which to diffuse and disperse heat to the ambient environment. Thus, neckband 330 may allow for greater battery and computation capacity than might otherwise have been possible on a stand-alone eyewear device. Since weight carried in neckband 330 may be less invasive to a user than weight carried in eyewear device 305, a user may tolerate wearing a lighter eyewear device and carrying or wearing the paired device for greater lengths of time than a user would tolerate wearing a heavy standalone eyewear device, thereby enabling users to incorporate extended reality environments more fully into their day-to-day activities.

Neckband 330 may be communicatively coupled with eyewear device 305 and/or to other devices. These other devices may provide certain functions (e.g., tracking, localizing, depth mapping, processing, storage) to augmented reality system 300. In the embodiment of FIG. 3A, neckband 330 may include two acoustic transducers (e.g., 325(I) and 325(J)) that are part of the microphone array (or potentially form their own microphone subarray). Neckband 330 may also include a controller 342 and a power source 345.

Acoustic transducers 325(I) and 325(J) of neckband 330 may be configured to detect sound and convert the detected sound into an electronic format (analog or digital). In the embodiment of FIG. 3A, acoustic transducers 325(I) and 325(J) may be positioned on neckband 330, thereby increasing the distance between the neckband acoustic transducers 325(I) and 325(J) and other acoustic transducers 325 positioned on eyewear device 305. In some cases, increasing the distance between acoustic transducers 325 of the microphone array may improve the accuracy of beamforming performed via the microphone array. For example, if a sound is detected by acoustic transducers 325(C) and 325(D) and the distance between acoustic transducers 325(C) and 325 (D) is greater than, e.g., the distance between acoustic transducers 325(D) and 325(E), the determined source location of the detected sound may be more accurate than if the sound had been detected by acoustic transducers 325(D) and 325(E).

Controller 342 of neckband 330 may process information generated by the sensors on neckband 330 and/or augmented reality system 300. For example, controller 342 may process information from the microphone array that describes sounds detected by the microphone array. For each detected sound, controller 342 may perform a direction-of-arrival (DOA) estimation to estimate a direction from which the detected sound arrived at the microphone array. As the microphone array detects sounds, controller 342 may populate an audio data set with the information. In embodiments in which augmented reality system 300 includes an inertial measurement unit, controller 342 may compute all inertial and spatial calculations from the IMU located on eyewear device 305. A connector may convey information between augmented reality system 300 and neckband 330 and between augmented reality system 300 and controller 342. The information may be in the form of optical data, electrical data, wireless data, or any other transmittable data form. Moving the processing of information generated by augmented reality system 300 to neckband 330 may reduce weight and heat in eyewear device 305, making it more comfortable to the user.

Power source 345 in neckband 330 may provide power to eyewear device 305 and/or to neckband 330. Power source 345 may include, without limitation, lithium-ion batteries, lithium-polymer batteries, primary lithium batteries, alkaline batteries, or any other form of power storage. In some cases, power source 345 may be a wired power source. Including power source 345 on neckband 330 instead of on eyewear device 305 may help better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as virtual reality system 350 in FIG. 3B, that mostly or completely covers a user's field of view. Virtual reality system 350 may include a front rigid body 355 and a band 360 shaped to fit around a user's head. Virtual reality system 350 may also include output audio transducers 365(A) and 365(B). Furthermore, while not shown in FIG. 3B, front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include a variety of types of visual feedback mechanisms. For example, display devices in augmented reality system 300 and/or virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (e.g., a single lens configuration that directly collimates light but results in so-called pincushion distortion) and/or a pupil-forming architecture (e.g., a multi-lens configuration that produces so-called barrel distortion to nullify pincushion distortion).

In addition to or instead of using display screens, some of the extended reality systems described herein may include one or more projection systems. For example, display devices in augmented reality system 300 and/or virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (e.g., diffractive, reflective, and refractive elements and gratings), and/or coupling elements. Extended reality systems may also be configured with any other suitable type or form of image projection system, such as retinal projectors used in virtual retina displays.

The extended reality systems described herein may also include various types of computer vision components and subsystems. For example, augmented reality system 300 and/or virtual reality system 350 may include one or more optical sensors, such as 2D or 3D cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises), entertainment purposes (e.g., for playing video games, listening to music, watching video content), and/or for accessibility purposes (e.g., as hearing aids, visual aids). The embodiments disclosed herein may enable or enhance a user's extended reality experience in one or more of these contexts and environments and/or in other contexts and environments.

As noted, extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
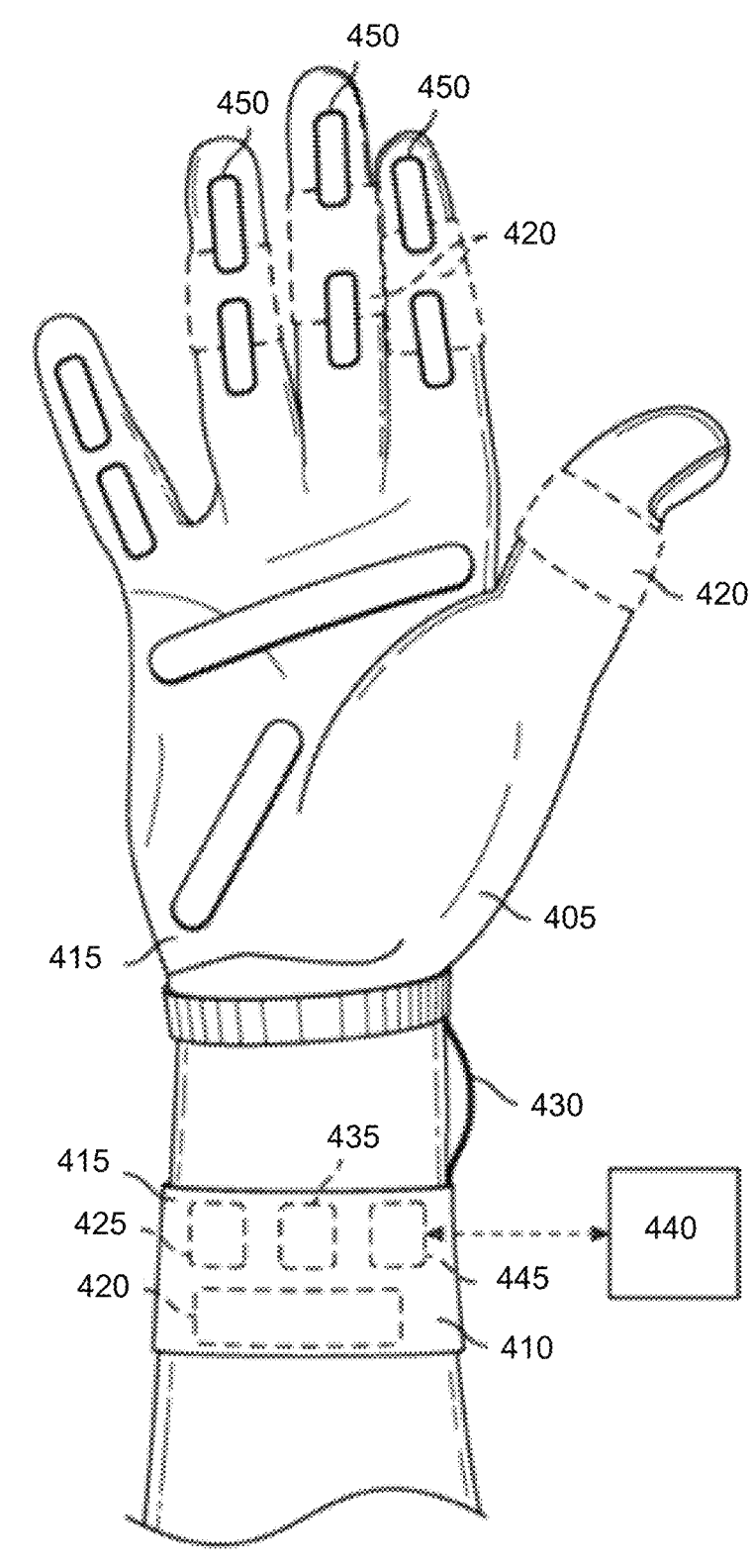
FIG. 4A is an illustration of haptic devices in accordance with various embodiments.

Haptic feedback may be provided by interfaces positioned within a user's environment (e.g., chairs, tables, floors) and/or interfaces on articles that may be worn or carried by a user (e.g., gloves, wristbands). As an example, FIG. 4A illustrates a vibrotactile system 400 in the form of a wearable glove (haptic device 405) and wristband (haptic device 410). Haptic device 405 and haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. Vibrotactile devices 420 may be positioned in locations to provide a vibrating sensation (e.g., haptic feedback) to a user of vibrotactile system 400. For example, vibrotactile devices 420 may be positioned against the user's finger(s), thumb, or wrist, as shown in FIG. 4A. Vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to vibrotactile devices 420, such as via conductive wiring 430. In some examples, each of vibrotactile devices 420 may be independently electrically coupled to power source 425 for individual activation. In some embodiments, a processor 435 may be operatively coupled to power source 425 and configured (e.g., programmed) to control activation of vibrotactile devices 420.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 440. For example, vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed reality) device, a personal computer, a tablet computer, a network device (e.g., a modem, a router), and a handheld controller. Communications interface 445 may enable communications between vibrotactile system 400 and the other device or system 440 via a wireless (e.g., Wi-Fi, Bluetooth, cellular, radio) link or a wired link. If present, communications interface 445 may be in communication with processor 435, such as to provide a signal to processor 435 to activate or deactivate one or more of the vibrotactile devices 420.

Vibrotactile system 400 may optionally include other subsystems and components, such as touch-sensitive pads 450, pressure sensors, motion sensors, position sensors, lighting elements, and/or user interface elements (e.g., an on/off button, a vibration control element). During use, vibrotactile devices 420 may be configured to be activated for a variety of different reasons, such as in response to the user's interaction with user interface elements, a signal from the motion or position sensors, a signal from the touch-sensitive pads 450, a signal from the pressure sensors, and a signal from the other device or system 440.

Although power source 425, processor 435, and communications interface 445 are illustrated in FIG. 4A as being positioned in haptic device 410, the present disclosure is not so limited. For example, one or more of power source 425, processor 435, or communications interface 445 may be positioned within haptic device 405 or within another wearable textile.

Figure 4B:
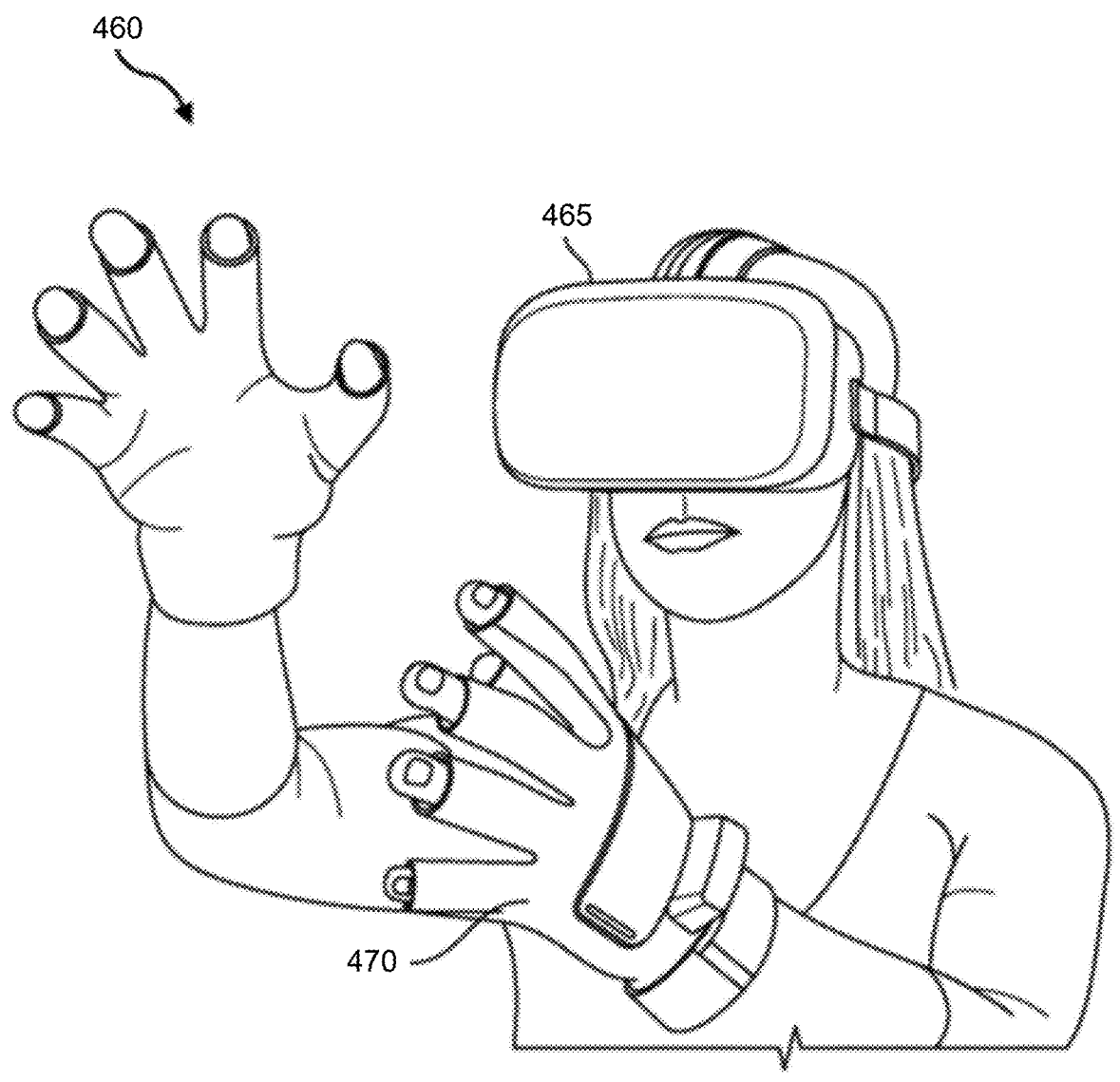
FIG. 4B is an illustration of an exemplary virtual reality environment in accordance with various embodiments.

Haptic wearables, such as those shown in and described in connection with FIG. 4A, may be implemented in a variety of types of extended reality systems and environments. FIG. 4B shows an example extended reality environment 460 including one head-mounted virtual reality display and two haptic devices (e.g., gloves), and in other embodiments any number and/or combination of these components and other components may be included in an extended reality system. For example, in some embodiments, there may be multiple head-mounted displays each having an associated haptic device, with each head-mounted display, and each haptic device communicating with the same console, portable computing device, or other computing system.

Figure 3B:
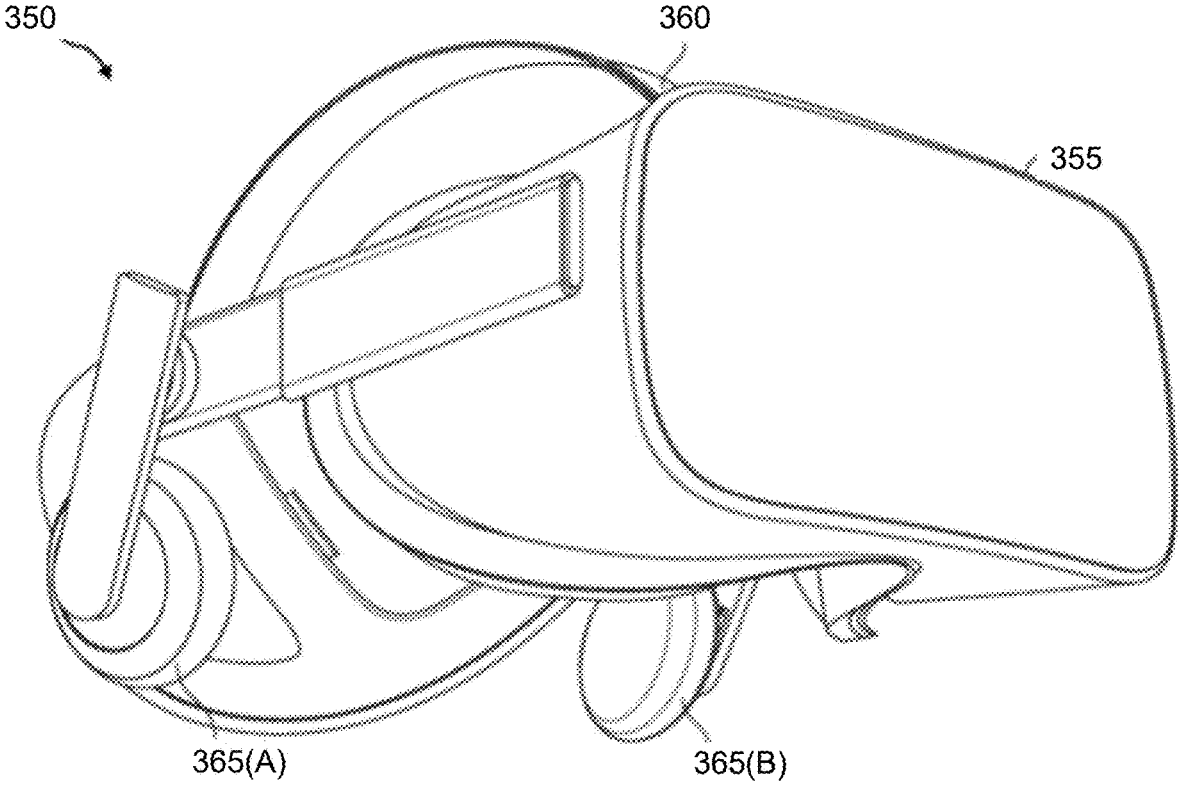
FIG. 3B is an illustration of a virtual reality system in accordance with various embodiments.

HMD 465 generally represents any type or form of virtual reality system, such as virtual reality system 350 in FIG. 3B. Haptic device 470 generally represents any type or form of wearable device, worn by a user of an extended reality system, that provides haptic feedback to the user to give the user the perception that he or she is physically engaging with a virtual object. In some embodiments, haptic device 470 may provide haptic feedback by applying vibration, motion, and/or force to the user. For example, haptic device 470 may limit or augment a user's movement. To give a specific example, haptic device 470 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
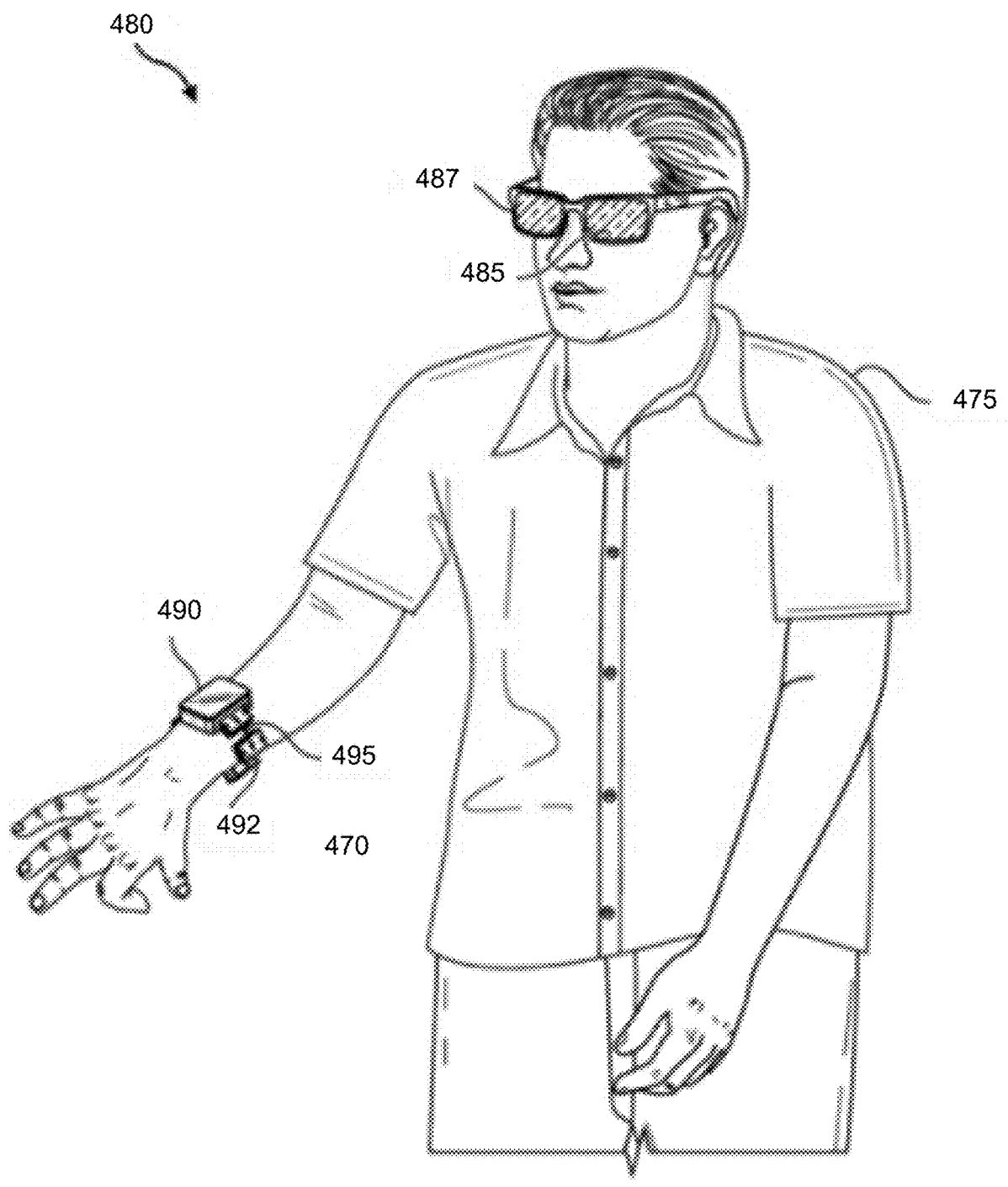
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C. FIG. 4C is a perspective view of a user 475 interacting with an augmented reality system 480. In this example, user 475 may wear a pair of augmented reality glasses 485 that may have one or more displays 487 and that are paired with a haptic device 490. In this example, haptic device 490 may be a wristband that includes a plurality of band elements 492 and a tensioning mechanism 495 that connects band elements 492 to one another.

One or more of band elements 492 may include any type or form of actuator suitable for providing haptic feedback. For example, one or more of band elements 492 may be configured to provide one or more of various types of cutaneous feedback, including vibration, force, traction, texture, and/or temperature. To provide such feedback, band elements 492 may include one or more of various types of actuators. In one example, each of band elements 492 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 405, 410, 470, and 490 may include any suitable number and/or type of haptic transducer, sensor, and/or feedback mechanism. For example, haptic devices 405, 410, 470, and 490 may include one or more mechanical transducers, piezoelectric transducers, and/or fluidic transducers. Haptic devices 405, 410, 470, and 490 may also include various combinations of different types and forms of transducers that work together or independently to enhance a user's extended reality experience. In one example, each of band elements 492 of haptic device 490 may include a vibrotactor (e.g., a vibrotactile actuator) configured to vibrate in unison or independently to provide one or more various types of haptic sensations to a user.

Providing Explainable Artificial Intelligence within Extended Reality

Figure 5:
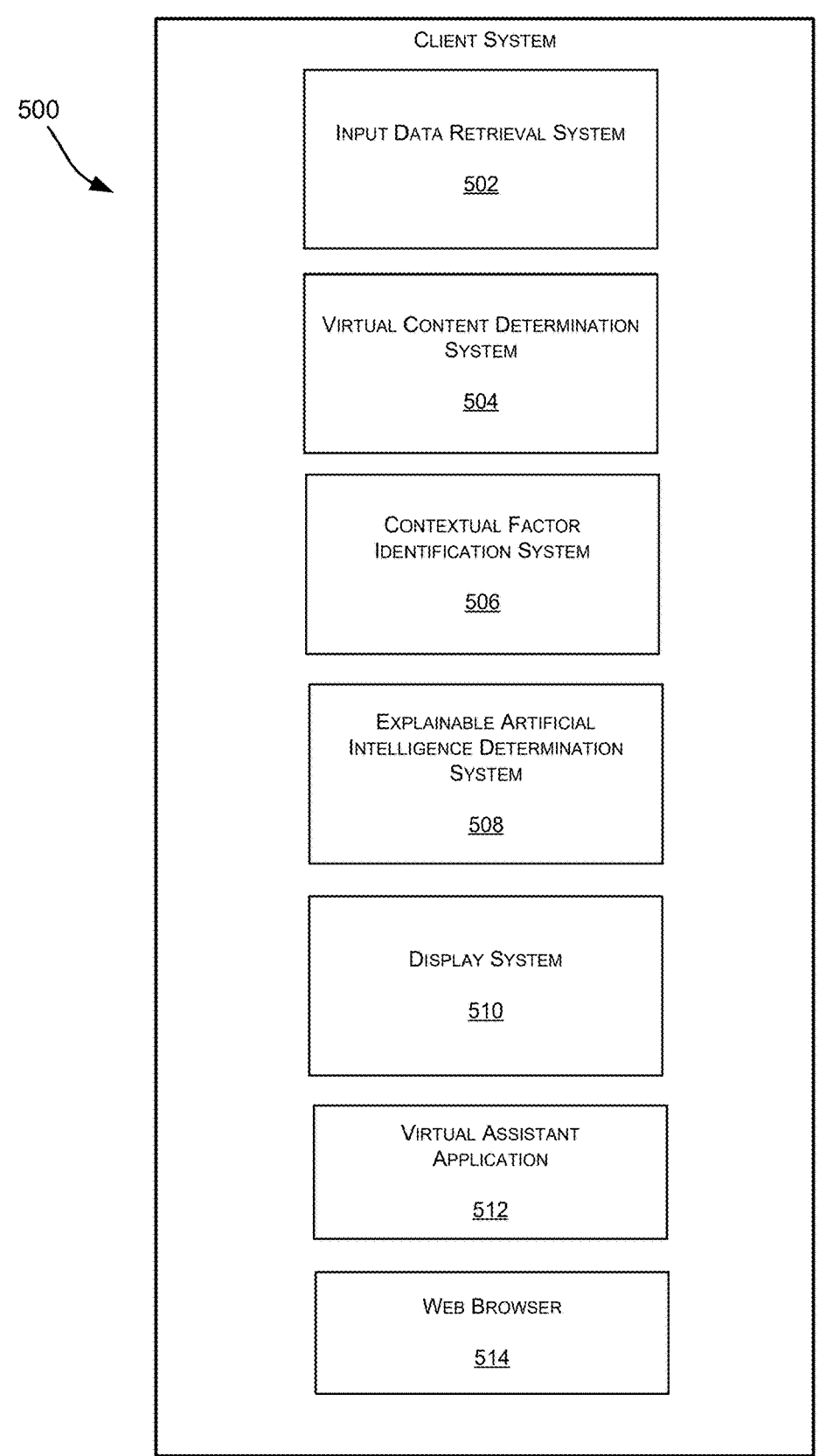
FIG. 5 is an illustration of an embodiment of a client system for providing explainable artificial intelligence within extended reality in accordance with various embodiments.

FIG. 5 illustrates an embodiment of a client system 500. In one embodiment, the client system 500 may represent the client system 105 of FIG. 1. As shown in FIG. 5, the client system 500 includes an input data retrieval system 502, a virtual content determination system 504, a contextual factor identification system 506, an explainable artificial intelligence determination system 508, a display system 510, a virtual assistant application 512, and a web browser 514.

In one embodiment, the input data retrieval system 502 may obtain input data. For example, the input data may include environmental information that describes a current environment of the user. In another example, the input data may include user state information that describes a current state of the user. In yet another example, the input data may include user profile information that describes one or more preferences of the user. Exemplary methods by which the aforementioned input data is obtained is described in more detail in FIG. 6.

Additionally, in one embodiment, the virtual content determination system 504 determines virtual content to be presented to a user via the head-mounted device, based on the input data. In one embodiment, the input data may be provided as input directly into one or more machine learning/artificial intelligence environments that are included within the virtual content determination system 504. In another embodiment, or more elements may be extracted from the input data, and the extracted elements may be provided as input to one or more trained machine learning/artificial intelligence environments. Exemplary methods by which the virtual content is determined is described in more detail in FIG. 6.

Further, in one embodiment, the contextual factor identification system 506 identifies one or more contextual factors associated with the virtual content. In one embodiment, the contextual factors may include one or more system goals, one or more user goals, one or more components of a user profile, etc. In another embodiment, the contextual factors may also include a current state of the user, a current location of the user, a current time, a current environment of the user, etc. Exemplary methods by which the one or more contextual factors are identified is described in more detail in FIG. 6.

Further still, in one embodiment, the explainable artificial intelligence determination system 508 determines explainable artificial intelligence (XAI) content that describes one or more aspects of the virtual content, based on the virtual content and the one or more contextual factors. In one embodiment, the XAI determination system 508 may determine an intersection of the one or more contextual factors and may determine XAI content that fulfills the intersection of the one or more contextual factors. In another embodiment, the XAI determination system 508 may determine the XAI content based on one or more system goals, one or more user goals, a user profile, etc. Exemplary methods by which the XAI content is determined is described in more detail in FIG. 6.

Also, in one embodiment, the display system 510 presents the virtual content and the explainable artificial intelligence content in an extended reality environment displayed to the user (e.g., utilizing a head-mounted device, etc.). In one embodiment, the display system 510 may determine a timing of a presentation of the XAI content based on the virtual content and the one or more contextual factors. In another embodiment, the display system 510 may determine a means by which the XAI content is presented (e.g., a modality of the XAI content) based on the virtual content and the one or more contextual factors. In yet another embodiment, the display system 510 may determine a level of detail in which the XAI content is presented. Exemplary methods by which the virtual content and the explainable artificial intelligence content is presented is described in more detail in FIG. 6.

In addition, the virtual assistant application 512 may correspond to the virtual assistant application 130 of FIG. 1, and the web browser 514 may correspond to the web browser 135 of FIG. 1.

In this way, the exemplary client system 500 may present virtual content to the user and may also present XAI content as a supplement to the virtual content to assist a user in their understanding of the virtual content. This may improve a level of trust that the user has with the virtual content and the exemplary client system 500 providing such content. Also, by determining the most relevant, efficient, and effective way to provide XAI content to the user, less XAI content may need to be generated. This may reduce an amount of processing required by the exemplary client system 500, which may improve a performance of the exemplary client system 500, reduce an amount of power used by the exemplary client system 500, etc.

Illustrative Methods

Figure 13:
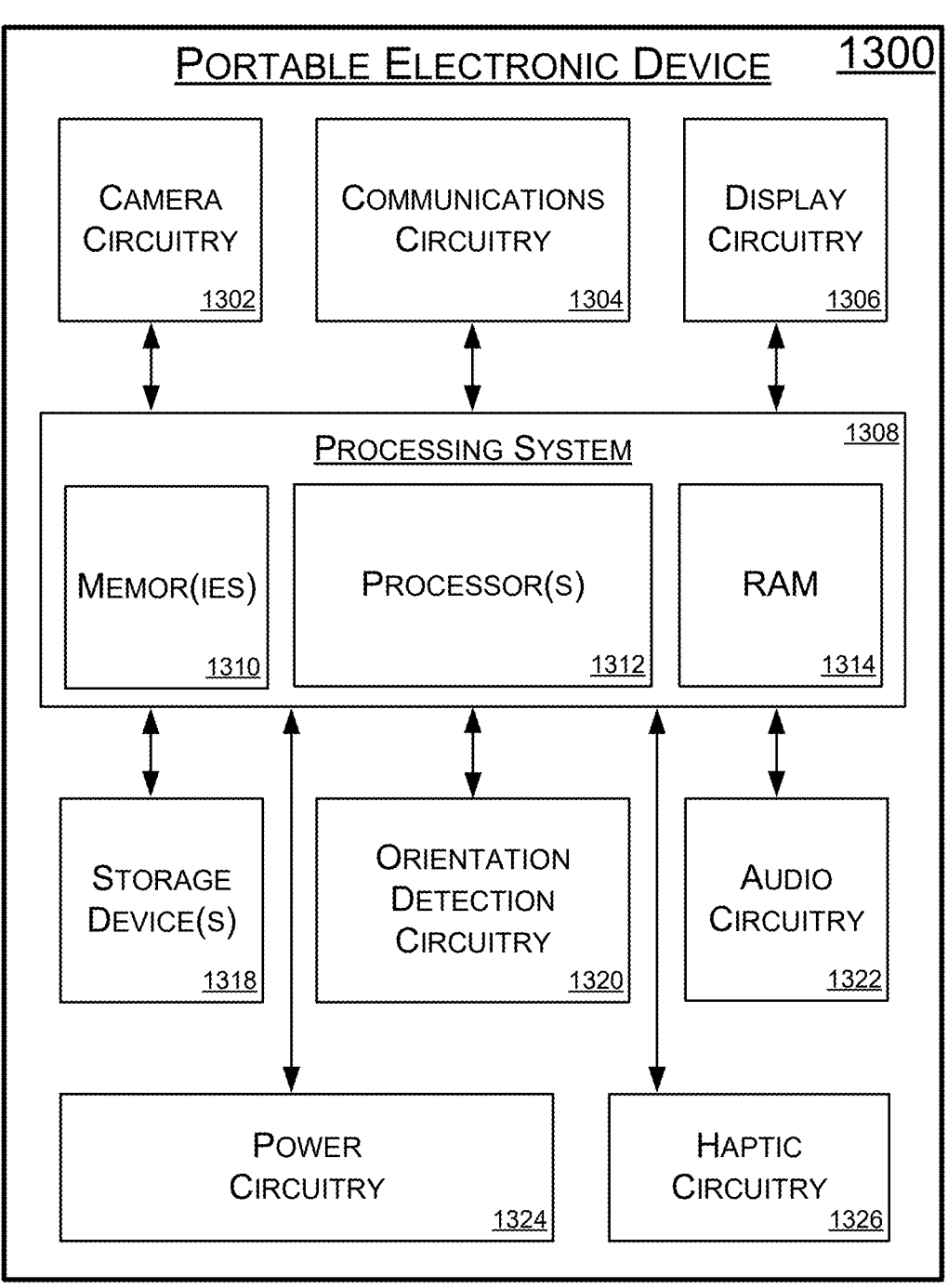
FIG. 13 is an illustration of a portable electronic device in accordance with various embodiments.

FIG. 6 is an illustration of a flowchart of an example process 600 for providing explainable artificial intelligence within extended reality in accordance with various embodiments. In some examples, the process is implemented by client system 105 described above, exemplary client system 500 described above, or a portable electronic device, such as portable electronic device 1300 as shown in FIG. 13. The process 600 can be implemented in software or hardware or any combination thereof.

At block 602, input data is obtained at a head-mounted device of a user. In one embodiment, the head mounted device may include the client system 105 of FIG. 1. In another embodiment, the head-mounted device may implement an augmented reality (AR)/extended reality system. In yet another embodiment, the head-mounted device may include one or more displays to display content to a user, one or more sensors to capture input data including images of a visual field of the user, one or more processors, etc.

Additionally, in one embodiment, the input data may include environmental information that describes a current environment of the user. For example, the environmental information may include one or more details of a current environment of the user. In another example, the environmental information may include visual information (such as a video and/or image representing a current view of a user) that is captured utilizing one or more cameras of the head-mounted device. In yet another example, the environmental information may include audio (such as current environmental audio at a user's location) that is captured utilizing one or more microphones of the head-mounted device.

Further, in one example, the environmental information may include a user's current movement that is captured utilizing one or more sensors (such as one or more accelerometers) of the head-mounted device. In another example, the environmental information may include one or more current environmental conditions (such as temperature, humidity, etc.) that are captured utilizing one or more sensors (such as temperature sensors, humidity sensors, etc.) of the head-mounted device. In yet another example, the environmental information may include one or more objects (e.g., a thermostat, refrigerator, phone, laptop, etc.) within an environment of the user that are identified via communications with one or more components (e.g., a Bluetooth transmitter/receiver, a WiFi transmitter/receiver, an RFID transmitter/receiver, etc.) of the head-mounted device.

For instance, a Bluetooth transmitter within the head-mounted device of the user may transmit a signal within an environment of the user using a Bluetooth protocol, and may identify one or more objects by receiving a response via the Bluetooth protocol from the one or more objects within the environment. In another embodiment, the environmental information may include one or more objects (e.g., furniture, trees, bicycles, etc.) within an environment of the user that are identified via one or more components (e.g., an egocentric camera, a light detection and ranging (LiDAR) scanner, etc.) of the head-mounted device. For example, a LiDAR scanner within the head-mounted device of the user may scan an environment of the user to identify one or more objects within the environment.

Further still, in one embodiment, the environmental information may include a current time that is determined utilizing an internal clock of the head-mounted device, an external clock referenced by the head-mounted device, etc. In another embodiment, the input data may include user state information that describes a current state of the user. For example, the user state information may include one or more activities currently being performed by the user. For instance, the one or more activities may be determined by monitoring user activities utilizing one or more cameras within the head-mounted device (such as an egocentric camera).

Also, in one example, the user state information may include a current cognitive load of the user. For instance, the cognitive load of the user may include an amount of cognitive activity that the user is currently experiencing. In another example, the cognitive load of the user may be determined by tracking eye movement of the user utilizing an eye tracker within the head-mounted device, tracking brain activity of the user utilizing an electroencephalogram (EEG) within the head-mounted device, etc.

In addition, in one embodiment, the user state information may include a current attention of the user. For example, the current attention of the user may be determined by tracking a gaze of the user utilizing an eye tracker within the head-mounted device, etc. In another embodiment, the user state information may include a current emotion of the user. For example, the current emotion of the user may be determined by monitoring a facial expression of the user (e.g., utilizing facial tracking technology within the head-mounted device), by monitoring brain activity of the user utilizing an electroencephalogram (EEG) within the head-mounted device, etc. In yet another embodiment, the user state information may include a potential intent of the user.

Furthermore, in one embodiment, the input data may include user profile information that describes one or more preferences of the user. For example, one or more communication components within the head-mounted device (such as one or more network communications components) may retrieve user profile information from one or more sources (e.g., one or more databases, etc.). In another example, the user profile information may include schedule data (such as details of a user's schedule), preference data (e.g., one or more predetermined user preferences).

Further still, in one example, the user profile information may include a profile for the user interacting with (e.g., wearing) the head-mounted device. In another example, the user profile information may include predetermined information entered by the user, information derived from past user behavior, etc. In yet another example, the user profile information may include the user's technological literacy of AI (e.g., a user's working knowledge of AI, how AI works, etc.). In still another example, the user profile information may include one or more demographics of the user.

Also, in one example, the user profile information may include one or more preferences of the user (e.g., a preferred form of content for the user, a preferred form of supplemental notifications provided to the user, etc.). In another example, the user profile information may include one or more routines of the user. In yet another example, the user profile information may include an interaction history of the user with the head-mounted device and the AR system. In still another example, the user profile information may include one or more rules provided by the user. In another example, the user profile information may include internet activity associated with the user.

Additionally, at block 604, virtual content to be presented to the user via the head-mounted device is determined based on the input data. In one embodiment, the virtual content may be determined based on one or more of the environmental information, the user state information, and the user profile information. In another embodiment, the virtual content may be determined utilizing one or more machine learning/artificial intelligence environments.

For example, the one or more ML environments may be trained with input (such as predetermined environmental information, user state information, and user profile information) and associated labeled output (such as virtual content to be presented to the user, etc.). In another example, the one or more trained ML environments take as input the predetermined environmental information, user state information, and user profile information. In yet another example, the one or more ML environments may output the virtual content.

Further, in one embodiment, virtual content may be determined be performing one or more internet searches utilizing the input data. In another embodiment, the virtual content may be determined in response to a request from the user. For example, the request may include a verbal request. In another example, the request may include a selection of one or more icons from an interface.

Further still, in one embodiment, the input data may be provided as input directly into one or more machine learning/artificial intelligence environments. For example, the environmental information, the user state information, and the user profile information may be input directly into a trained machine learning/artificial intelligence environment that analyzes the input data and produces the virtual content. In another embodiment, or more elements may be extracted from the input data. For example, text within the input data may be parsed to identify one or more elements (such as keywords, etc.) that are then extracted from the text.

Also, in one embodiment, images and/or video within the input data may be analyzed to identify one or more objects and/or characteristics of the input data. For example, the images may include an image of a current view of the user. In another example, image recognition may be performed on the image to determine a textual representation of one or more objects within the current view of the user. In yet another example, a trained machine learning/artificial intelligence environment may take one or more images as input and may output a textual representation of one or more objects within the images.

In addition, in one embodiment, the extracted elements may be provided as input to one or more trained machine learning/artificial intelligence environments. For example, extracted text and/or a textual representation of one or more objects may be provided as input to a machine learning/artificial intelligence environment, where the machine learning/artificial intelligence environment outputs virtual content to be provided to the user.

In one example, in response to opening a refrigerator, a user's current view of the inside of the refrigerator may be captured. The image of the inside of the refrigerator may be input into a machine learning/artificial intelligence environment that performs object identification within the image and outputs an identification of one or more food items within the refrigerator. User preference data including dietary restrictions may also be retrieved from one or more databases. Additionally, a current time may also be retrieved from a central time source.

Further, text describing one or more food items within the refrigerator, as well as the current time and one or more dietary restrictions for the user, may be input into a trained machine learning/artificial intelligence environment. The trained machine learning/artificial intelligence environment may output one or more suggested recipes that utilize the one or more food items. In another example, an internet search may be performed utilizing the text describing one or more food items within the refrigerator, as well as the current time and one or more dietary restrictions for the user. The internet search may be performed for recipes based on a current time, dietary restrictions, and the identified food items.

Further still, in one example, in response to opening a closet door, a user's current view of the inside of the closet may be captured. The image of the inside of the closet may be input into a machine learning/artificial intelligence environment that performs object identification within the image and outputs an identification of one or more articles of clothing within the closet. User fashion preference data may also be retrieved from one or more databases. A current time and a current weather may also be retrieved (from a central time source, a weather website, etc.).

Also, text describing one or more articles of clothing within a closet, as well as the user fashion preference data, the current time, and the current weather, may be input into a trained machine learning/artificial intelligence environment. The trained machine learning/artificial intelligence environment may output one or more suggested outfits based on the input. In another example, an internet search may be performed utilizing the text describing one or more articles of clothing within a closet, as well as the user fashion preference data, the current time, and the current weather. The internet search may be performed for outfits based on the text describing one or more articles of clothing within a closet, as well as the user fashion preference data, the current time, and the current weather.

Additionally, in one embodiment, the virtual content may include one or more of visual content, audio content, haptic content, etc.

Further, at block 606, one or more contextual factors associated with the virtual content are identified. In one embodiment, the contextual factors may include one or more system goals. For example, the one or more system goals may include goals of an augmented reality (AR) system implemented by the head-mounted device. In another example, the one or more system goals may include the discovery of new intent by the user (e.g., assisting the user in exploring new information that is previously unknown by the user, etc.).

Further still, in one embodiment, the one or more system goals may include the assistance of an existing intent by the user (e.g., assisting the user to implement a goal identified by the user, etc.). In another embodiment, the one or more system goals may include error management (e.g., explaining how the virtual content was determined). In yet another embodiment, the one or more system goals may include trust building (e.g., offering transparency as to how the virtual content was determined).

Also, in one embodiment, the one or more system goals may be predetermined (e.g., by an administrator of the AR system, etc.) and may be stored in one or more databases. In another embodiment, the head-mounted device (or a remote computing device connected to the head-mounted device via one or more networks) may retrieve the one or more system goals from the one or more databases.

In addition, in one embodiment, the contextual factors may include one or more user goals. For example, the one or more user goals may include the resolution of confusion/surprise by the user (e.g., by explaining any differences between the virtual content and virtual content expected by the user). In another example, the one or more user goals may include the awareness of privacy within the AR system (e.g., by disclosing to the user what data is being used to determine the virtual content, etc.). In yet another example, the one or more user goals may include the assurance of reliability within the AR system (e.g., by conveying to the user the reliability and accountability of the virtual content, etc.). In still another example, the one or more user goals may include the informing of a user of one or more reasons/processes behind the determination of the virtual content by the AR system.

Furthermore, in one embodiment, the one or more user goal may be predetermined (e.g., by the user of the AR system, etc.). In another embodiment, the one or more user goals may be stored at one or more databases, etc. In yet another embodiment, the head-mounted device (or a remote computing device connected to the head-mounted device via one or more networks) may retrieve the one or more user goals from the one or more databases.

Further still, in one embodiment, the contextual factors may include one or more components of a user profile. For example, the user profile may include user profile information that describes one or more preferences of the user (as described in block 602). In another example, the user profile may be stored at one or more databases, etc. In yet another example, the head-mounted device (or a remote computing device connected to the head-mounted device via one or more networks) may retrieve the user profile from the one or more databases.

Also, in one embodiment, the contextual factors may include a current state of the user. For example, the current state of the user may include one or more activities currently being performed by the user. For instance, the one or more activities may be determined by monitoring user activities utilizing one or more cameras within the head-mounted device (such as an egocentric camera). In another example, the current state of the user may include a current cognitive load of the user. For instance, the cognitive load of the user may include an amount of cognitive activity that the user is currently experiencing. In another example, the cognitive load of the user may be determined by tracking eye movement of the user utilizing an eye tracker within the head-mounted device, tracking brain activity of the user utilizing an electroencephalogram (EEG) within the head-mounted device, etc.

Additionally, in one embodiment, the current state of the user may include a current attention of the user. For example, the current attention of the user may be determined by tracking a gaze of the user utilizing an eye tracker within the head-mounted device, etc. In another embodiment, the current state of the user may include a current emotion of the user. For example, the current emotion of the user may be determined by monitoring a facial expression of the user (e.g., utilizing facial tracking technology within the head-mounted device), by monitoring brain activity of the user utilizing an electroencephalogram (EEG) within the head-mounted device, etc. In yet another embodiment, the current state of the user may include a potential intent of the user.

Further, in one embodiment, the contextual factors may include a current location of the user. For example, the current location may be determined utilizing one or more cameras within the head-mounted device. In another example, the one or more cameras may produce one or more images that are analyzed to determine a current location of the user. In yet another example, a global positioning system (GPS) of the head-mounted device may be used to determine the current location of the user.

Further still, in one embodiment, the contextual factors may include a current time. For example, the current time may be retrieved from an internal clock within the head-mounted device. In another embodiment, the contextual factors may include a current environment of the user. For example, the current environment may include an identification of one or more objects within the user's environment. These objects may be determined in a manner similar to the methods described in block 602.

Also, at block 608, explainable artificial intelligence (XAI) content is determined that describes one or more aspects of the virtual content, based on the virtual content and the one or more contextual factors. In one embodiment, the XAI content may provide additional information about the determination of the virtual content. For example, the XAI content may include an explanation of one or more actions that were performed during determination of the virtual content. In another example, the XAI content may include a subset of the input data. In yet another example, the XAI content may include an indication as to how the virtual content was determined based on the input data. In still another example, the XAI content may include a description of one or more actions performed during the determination of the virtual content.

Also, in one embodiment, the XAI content may include an identification of one or more instances of the input data used to determine the virtual content, the input data including one or more of environmental information, user state information, and user profile information. For example, the determination of the virtual content may be analyzed to identify the specific input data used to determine the virtual content.

In another embodiment, the XAI content may include an identification of one or more weights assigned to the specific input data during the determination of the virtual content. For example, the determination of the virtual content may be analyzed to identify one or more weights assigned to the specific input data during the determination of the virtual content.

In yet another embodiment, the XAI content may include an identification of one or more methods applied to the specific input data to determine the virtual content, the methods including one or more machine learning methods, one or more algorithmic methods, etc. For example, the determination of the virtual content may be analyzed to identify one or more methods applied to the specific input data to determine the virtual content.

In addition, in one embodiment, an intersection of the one or more contextual factors may be determined. For example, an intersection of identified system goals, user goals, and user profile components may be determined. The intersection may include all overlapping categories within the contextual factors.

Furthermore, in one embodiment, XAI content may be determined that fulfills the intersection of the one or more contextual factors. For example, XAI content may be determined that fulfills the overlapping categories. In another embodiment, the XAI content may be determined based on one or more system goals. For example, the one or more contextual factors may include one or more system goals, and in response to determining that the one or more system goals include the discovery of new intent by the user, the determination of the virtual content may be analyzed to identify the specific input data used to determine the virtual content, wherein the specific input data may be included as XAI content. In another example, in response to determining that the system goals include the discovery of new intent by the user, the XAI content may include additional information explaining how the virtual content promotes the discovery of new intent by the user. In another example, if the virtual content includes a recommendation of a new clothing store, the XAI content may include user profile data (e.g., examples of similar stores that the user is interested in) and an explanation as to why the store is interesting to the user.

Further still, in one embodiment, the XAI content may be determined based on one or more user goals. For example, the one or more contextual factors may include one or more user goals, and in response to determining that the one or more user goals include the assurance of reliability within the AR system, the determination of the virtual content may be analyzed to identify one or more methods applied to the specific input data to determine the virtual content, wherein the one or more methods may be included as XAI content. In another example, if the virtual content includes an exercise recommendation, and the one or more user goals include the assurance of reliability within the AR system, the XAI content may include an explanation as to how the exercise recommendation was determined. This explanation may not be included in the XAI content if the one or more user goals weigh the awareness of privacy within the AR system over the assurance of reliability within the AR system.

Also, in one embodiment, the XAI content may be determined based on a user profile. For example, the one or more contextual factors may include a user profile, and in response to determining that the user profile indicates that a user's technological literacy of AI is low, the determination of the virtual content may be analyzed to identify the specific input data used to determine the virtual content, wherein the specific input data may be included as XAI content, and one or more methods applied to the specific input data to determine the virtual content may be withheld as XAI content. In another example, one or more specific techniques implemented by the AR system may be omitted from the XAI content in response to determining that the user's technological literacy of AI is low. In another embodiment, the XAI content may be determined utilizing one or more machine learning/artificial intelligence environments. For example, the one or more ML environments may be trained with training data input (such as input system goals, user goals, and user profile components as well as virtual content) and associated labeled output (such as XAI content to be presented to the user, etc.). In another example, the system goals, user goals, and user profile components, as well as the virtual content, may be input into the one or more trained ML environments. In yet another example, the one or more ML environments may perform inference on the input and may output the XAI content in response to the input.

Additionally, in one embodiment, the XAI content may be determined utilizing one or more predetermined workflows and/or rules (e.g., process flows, decision trees, etc.). For example, the one or more predetermined workflows may take as input system goals, user goals, and user profile components as well as virtual content. In another example, the one or more predetermined workflows may output the XAI content in response to the input.

Further, at block 610, the virtual content and the explainable artificial intelligence content is presented in an extended reality environment displayed to the user utilizing the head-mounted device. In one embodiment, a timing of a presentation of the XAI content may be determined based on the virtual content and the one or more contextual factors. For example, the XAI content may be automatically presented to the user in response to determining that a current cognitive load of the user is below a predetermined threshold. In another example, the XAI content may be automatically presented to the user in response to determining that a current amount of available time for the user is above a predetermined threshold.

Further still, in one embodiment, an option to view the XAI content may be presented to the user as a selectable option in response to determining that a current cognitive load of the user is above a predetermined threshold. For example, the selectable option may include a selectable icon, a verbal command, etc. In another embodiment, the XAI content may be automatically presented to the user in response to determining an existence of an expectation mismatch within the virtual content, as well as a determination that a current emotion of the user includes surprise and/or confusion. For example, if the virtual content includes a reminder to a user to bring an umbrella during a currently sunny day, and the user is determined to be surprised/confused by such reminder, XAI content indicating that rain is forecasted for the afternoon may be provided to the user.

Also, in one embodiment, the XAI content may be automatically presented to the user in response to determining that the virtual content includes an outcome that is unfamiliar to the user. For example, the virtual content may be compared to historical content provided to the user, and the XAI content may be presented to the user in response to determining that the virtual content includes content that was not found in the historical content provided to the user. In another example, if the virtual content includes a recommendation for a song, and the song is not included in a list of historical songs presented to the user, XAI content indicating how the recommended song was determined may be presented to the user with the song recommendation.

In addition, in one embodiment, the XAI content may be automatically presented to the user in response to determining that a confidence associated with the virtual content is below a predetermined threshold. For example, it may be determined, by an activity recognition component of an AR system, that a user is working on a computer in an office. In response to this determination, virtual content may be determined by the AR system that includes an initiation of a "do not disturb" mode within the AR system. In another example, it may be determined that the activity recognition component has a confidence level below a predetermined threshold value. In response to this determination, XAI content indicating that it was determined that the user is working on a computer in an office may be automatically presented to the user when the "do not disturb" mode is activated within the AR system.

Furthermore, in one embodiment, a means by which the XAI content is presented (e.g., a modality of the XAI content) may also be determined based on the virtual content and the one or more contextual factors. For example, a modality of the XAI content may be determined based on a modality of the virtual content. For instance, if the virtual content is presented visually, the XAI content may also be presented as visual output, and if the virtual content is presented audibly, the XAI content may also be presented as audible output.

Further still, in one embodiment, in response to determining that a first modality used to present the virtual content is overloaded, a second modality may be selected to present the XAI content. For example, the term modality may describe the means by which the virtual content and XAI content presented. In another example, the first modality may be determined to be overloaded in response to determining that an amount of information currently being presented via the first modality is above a predetermined threshold amount. In one example, when a user is driving and a navigation application presented via the head-mounted device suggests a detour route, one or more explanations associated with such detour route may be presented audibly in response to determining that an amount of information being presented via the navigation application is above a predetermined threshold amount. In another example, vibration-based virtual content may be accompanied by visual XAI content in response to determining that a user is in a loud environment. Also, the XAI content may be presented in a textual format, as one or more images, etc.

Also, in one embodiment, the XAI content may be initially presented with a first level of detail, with a selectable option to provide a second level of detail greater than the first level of detail if desired by the user. For example, the selectable option may have the same modality as the modality used to present the XAI content. For instance, if the XAI content includes audible content, the selectable option may be selected by speech recognition/analysis, and if the XAI content includes visual content, the selectable option may be selected via a visible icon.

Additionally, in one embodiment, the XAI content may initially include a short phrase (e.g., a phrase having less than a predetermined number of words), and a longer narrative may be provided in response to the selection of the selectable option. In another embodiment, the XAI content may initially include an icon or spotlight, and example images or heatmaps may be provided in response to the selection of the selectable option.

Further, in one embodiment, a level of compatibility between the XAI content and a current view of the user may be determined. For example, one or more knowledge graphs may be used to determine the level of compatibility between entities and their relationships. In another example, in response to determining that the level of compatibility between the XAI content and the current view of the user is greater than a predetermined threshold, the XAI content may be presented in an implicit pattern. For instance, the XAI content may be naturally embedded into the current view of the user.

Further still, in one embodiment, in response to determining that the level of compatibility between the XAI content and the current view of the user is less than a predetermined threshold, the XAI content may be presented in an explicit pattern. For example, the XAI content may be displayed as a dialogue window separate from the current view of the user.

In this way, XAI content may be presented as a supplement to the virtual content to assist a user in their understanding of the virtual content. This may improve a level of trust that the user has with the virtual content and the extended reality environment providing such content. Also, by determining the most relevant, efficient, and effective way to provide XAI content to the user, less XAI content may need to be generated. This may reduce an amount of processing required by hardware implementing the extended reality environment (such as a head-mounted device), which may improve a performance of such device, reduce an amount of power used by such device, etc.

Figure 7:
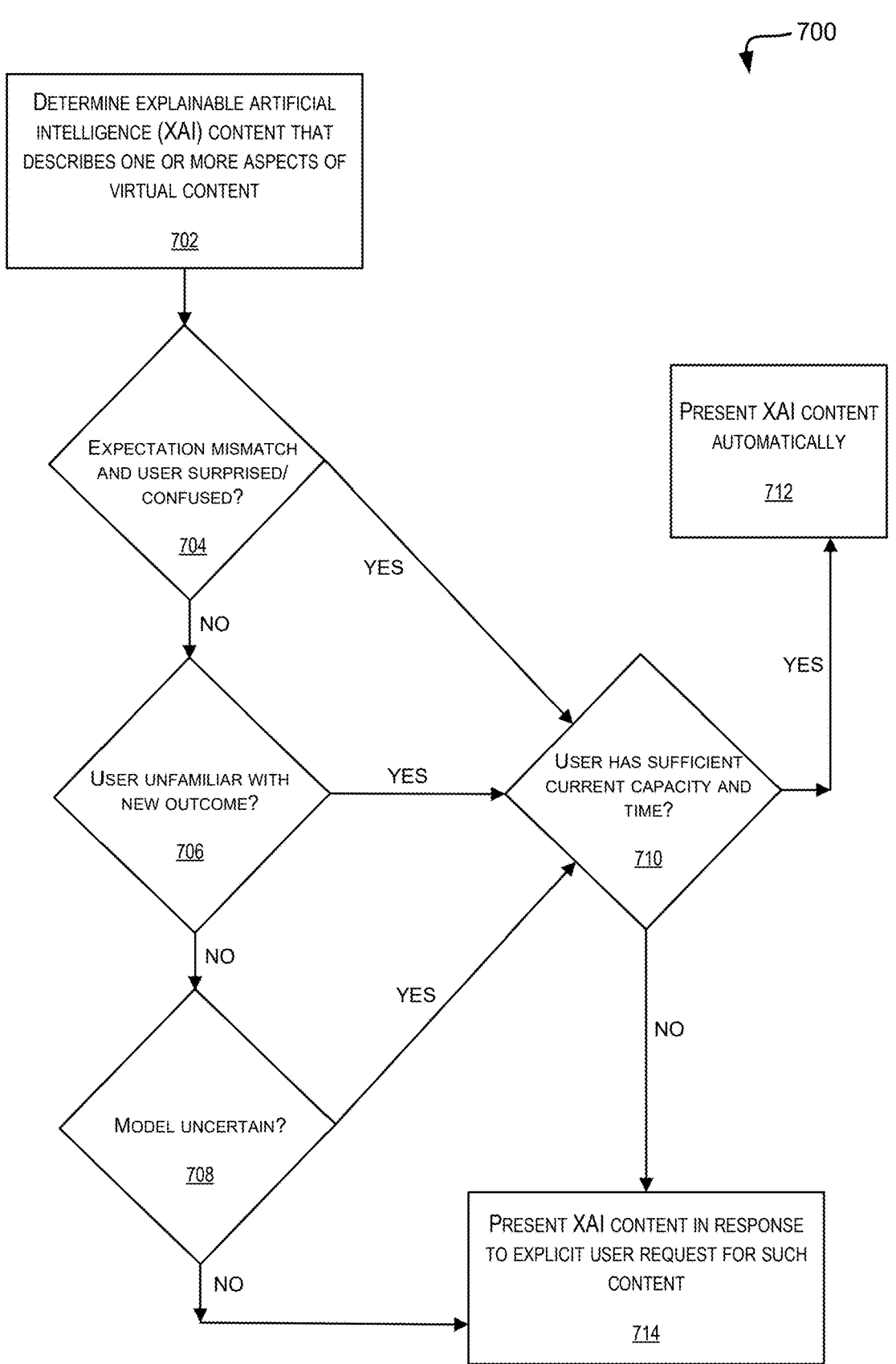
FIG. 7 is an illustration of a flowchart of an example process for determining when to present explainable artificial intelligence (XAI) content within extended reality in accordance with various embodiments.

FIG. 7 is an illustration of a flowchart of an example process 700 for determining when to present explainable artificial intelligence (XAI) content within extended reality. In some examples, the process is implemented by client system 105 described above, exemplary client system 500 described above, or a portable electronic device, such as portable electronic device 1300 as shown in FIG. 13. The process 700 can be implemented in software or hardware or any combination thereof.

At block 702, explainable artificial intelligence (XAI) content is determined that describes one or more aspects of virtual content. One exemplary method for determining such XAI content is described in block 608 of FIG. 6.

Additionally, at decision block 704, it is determined whether there is an expectation mismatch within the virtual content and the user is surprised and/or confused. In one embodiment, an expectation mismatch may be determined by comparing the virtual content to one or more instances of historical virtual content with similar input data. For example, the current virtual content may include a recommendation for a user to bring an umbrella with them before they leave their house, where the weather is currently sunny. This current virtual content may be compared to one or more instances of historical virtual content (e.g., where the user is leaving their house and the weather is currently sunny). Upon determining that the instances of historical virtual content do not include a recommendation for the user to bring an umbrella, it may be determined that the current virtual content includes an expectation mismatch.

Further, in one embodiment, it may be determined whether the user is surprised and/or confused by analyzing a current emotion of the user (as described in block 602 of FIG. 6).

Further still, if it is determined in decision block 704 that there is not both (1) an expectation mismatch within the virtual content and (2) the user is surprised and/or confused, then in decision block 706 it is determined whether the user is unfamiliar with the new outcome. In one embodiment, an expectation mismatch may be determined by comparing the virtual content to one or more instances of historical virtual content. For example, the current virtual content may include a recommendation for a particular song. This current virtual content may be compared to one or more instances of historical virtual content (e.g., previous songs recommended to the user). Upon determining that the instances of historical virtual content do not include a recommendation for current song, it may be determined that the current virtual content is unfamiliar with the current virtual content.

Also, if it is determined in decision block 706 that the user is familiar with the outcome, then in decision block 708 it is determined whether a model that determined the virtual content is uncertain. In one embodiment, a model (such as a machine learning/artificial intelligence model) may determine the content as well as a confidence level associated with the determination. This confidence level may be identified and compared to a threshold. In response to determining that the confidence level exceeds the threshold, it may be determined that the model is certain; conversely, response to determining that the confidence level does not exceeds the threshold, it may be determined that the model is uncertain.

In addition, if it is determined in decision block 708 that the model that determined the virtual content is certain in its determination, then in block 714 the XAI content is presented to the user in response to an explicit user request for such content. In one embodiment, the specific user request may be verbal, tactile (e.g., the selection of one or more icons within an interface), etc.

Furthermore, if it is determined in decision block 704 that there is both (1) an expectation mismatch within the virtual content and (2) the user is surprised and/or confused, or if it is determined in decision block 706 that the user is unfamiliar with the outcome, or if it is determined in decision block 708 that the model that determined the virtual content is not certain in its determination, then in decision block 710 it is determined whether the user has sufficient current capacity and time. For example, a current cognitive load of the user may be determined (as described in block 602 of FIG. 6) and compared to a first predetermined threshold, and a current amount of available time for the user may be determined (e.g., by referencing a current schedule of the user) and compared to a second predetermined threshold.

In response to determining that the current cognitive load of the user is less than the first predetermined threshold, and the current amount of available time for the user is above the second predetermined threshold, it may be determined that the user has sufficient current capacity and time. In response to determining that the current cognitive load of the user is greater than the first predetermined threshold, and/or that the current amount of available time for the user is less than the second predetermined threshold, it may be determined that the user does not have sufficient current capacity and time.

Further still, in response to determining in decision block 710 that the user does not have sufficient current capacity and time, then in block 714 the XAI content is presented to the user in response to an explicit user request for such content. In response to determining in decision block 710 that the user has sufficient current capacity and time, then in block 712 the XAI content is presented automatically (e.g., without requiring an explicit request from the user).

In this way, the XAI content may be presented to the user automatically or in response to an explicit user request, based on various criteria.

FIG. 8 is an illustration of a flowchart of an example process 600 for providing explainable artificial intelligence within extended reality based on a system goal, a user goal, and a user profile in accordance with various embodiments. In some examples, the process is implemented by client system 105 described above, exemplary client system 500 described above, or a portable electronic device, such as portable electronic device 1300 as shown in FIG. 13. The process 800 can be implemented in software or hardware or any combination thereof.

At block 802, virtual content to be presented to a user in an extended reality environment via a head-mounted device is identified. One example of such a determination is shown in block 604 of FIG. 6.

Additionally, at block 804, a system goal for the extended reality environment is determined. One example of such a determination is shown in block 606 of FIG. 6. Further, at block 806, a user goal and a user profile are determined for the user. One example of such a determination is also shown in block 606 of FIG. 6.

Further still, at block 808, explainable artificial intelligence (XAI) content is determined that describes one or more aspects of the virtual content, based on the system goal, the user goal, and the user profile. One example of such a determination is also shown in block 608 of FIG. 6.

In this way, personalized XAI content may be determined for virtual content by considering three factors: a system goal, a user goal, and a user profile.

Example Scenarios

Figure 9:
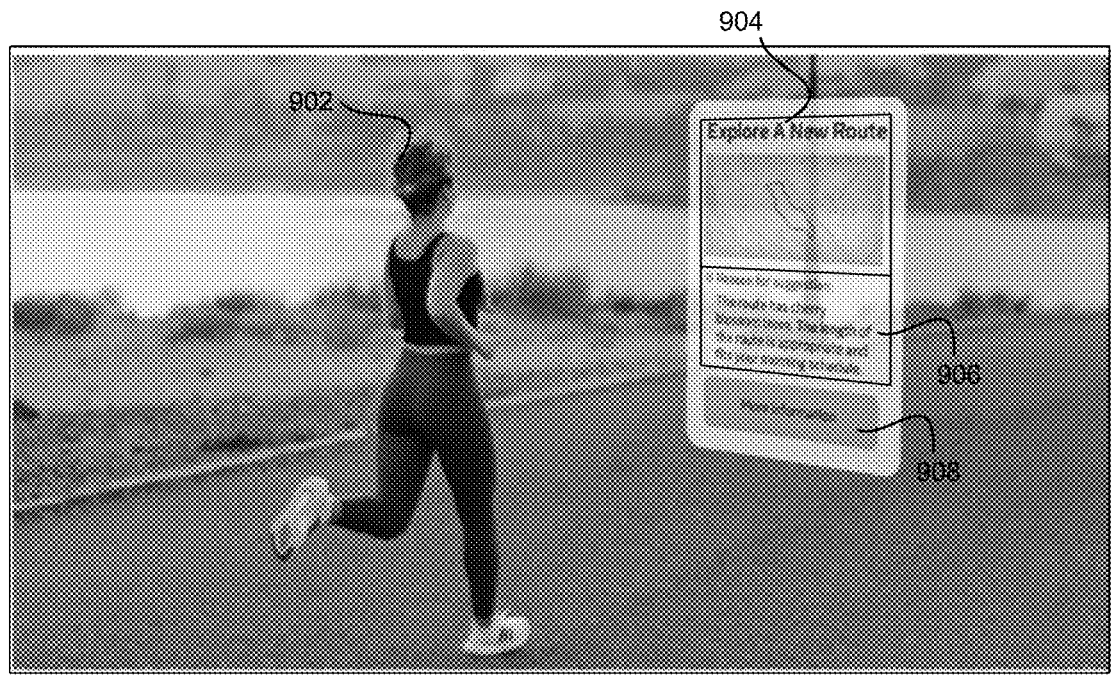
FIG. 9 is an illustration of an exemplary scenario including a route recommendation and personalized XAI content for a user when jogging, in accordance with various embodiments.

FIG. 9 illustrates an exemplary scenario 900 including a route recommendation and personalized XAI content for a user 902 when jogging, according to one embodiment. As shown, a user 902 may have a profile that is retrieved as input data by a system (such as the client system 500 of FIG. 5), where the profile indicates that the user 902 is an AI expert with high AI literacy. As the system determines (e.g., via image analysis from one or more cameras) that the user 902 is jogging in the morning on a quiet trail, the system checks a calendar and one or more seasonal web sites to determine that it is cherry-blossom season, and also analyzes a profile of the user 902 to determined that the user 902 loves cherry blossoms. In view of this additional input data, the system displays via AR glasses worn by the user 902 a map 904 in view of the user 902 that recommends a detour.

Cognitive measurements for the user 902 are determined that indicate that the user 902 is surprised, and a comparison with historical routes indicate that the suggested route is different from the regular route traveled by the user 902. The user 902 may also verbally request a reason behind the route recommendation.

In response to these contextual factors, cognitive measurements may be determined for the user 902 that indicate that the user 902 has enough current cognitive capacity. A user goal may be determined as resolving surprise. In response to these determinations, personalized XAI content including an explanation may be automatically determined.

For example, the system may determine additional contextual factors, including an indication that the system goal is user intent discovery (e.g., exploring a new route to see cherry blossoms), and that a profile of the user 902 indicates that the user 902 is an expert in AI. In response to the identification of these contextual factors, personalized XAI content may be determined utilizing one or more machine learning/artificial intelligence implementations (e.g., where such content includes an explanation that "This route is recommended based on seasons, your routine and preferences" as well as explanations that "The route has cherry blossom trees that you can enjoy" and that "The length of the route is appropriate and fits your morning schedule").

A subset 906 of this personalized XAI content may be displayed as default and may be expanded to show all content in detail. For example, the user 902 may can select an icon 908 to request additional information. The subset 906 of the personalized XAI content may be presented visually (e.g., in a manner that is the same as the recommendation presented via the map 904).

In one embodiment, the subset 906 of personalized XAI content may include text, while a detailed explanation may include cherry-blossom pictures from the new route (e.g., that are retrieved via an Internet search) to help explain the "Why" aspect in more detail. The subset 906 of personalized XAI content may also be shown explicitly below the map 904 including the route recommendation.

Figure 10:
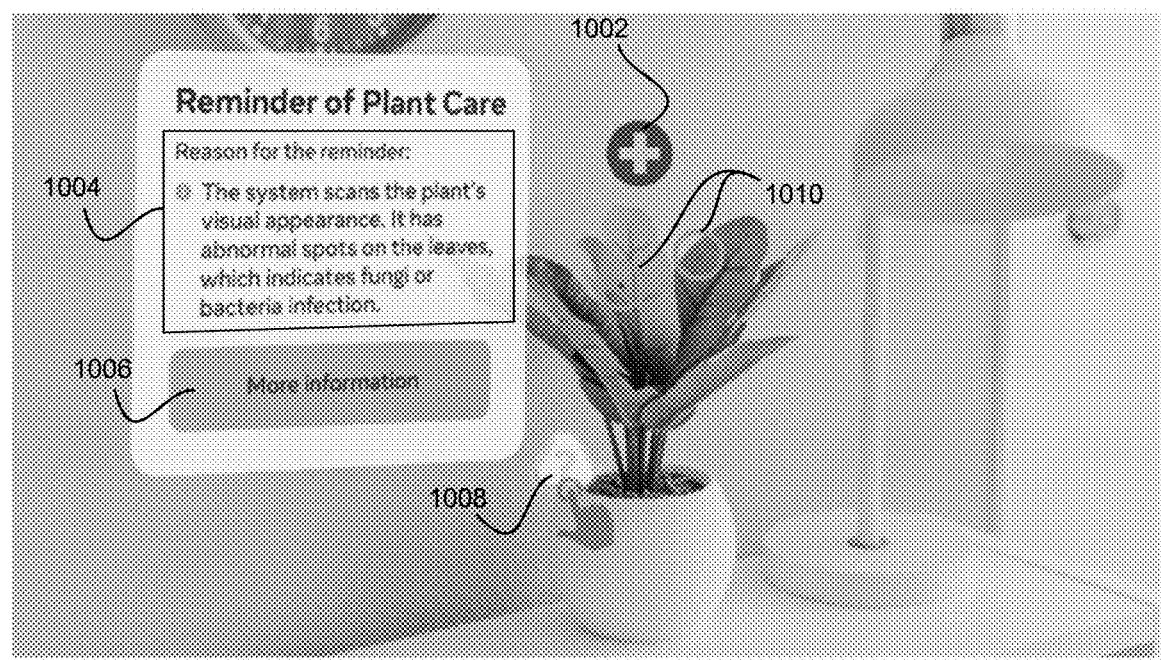
FIG. 10 is an illustration of an exemplary scenario including a plant care recommendation and personalized XAI content for a user, in accordance with various embodiments.

FIG. 10 illustrates an exemplary scenario 1000 including a plant care recommendation 1002 and personalized XAI content 1004 for a user, according to one embodiment. In one embodiment, a user may have a profile that is retrieved as input data by a system, where the profile indicates that the user is a general end-user with low AI literacy. The system (such as the client system 500 of FIG. 5) may also identify past conversation information for the user, including a conversation with a neighbor about gardening.

Additionally, the system may determine (e.g., via image analysis of one or more images captured by one or more cameras of the system) that the user is currently sitting on a sofa in front of a house plant of the user. The system may analyze the above contextual factors (e.g., the user profile, identified past conversations, and identification of a house plant in images) and may present a selectable icon 1008 that links to instructions on plant fertilization (e.g., where such instructions are identified/determined utilizing one or more machine learning/artificial intelligence environments based on the input data retrieved by the system).

The system may then identify that the user is concerned about technology invading their privacy and that the user wants to know the reason behind the recommendation. For example, the system may receive verbal input from the user requesting the reason behind the recommendation, and the system may parse the profile of the user to determine that the user has privacy concerns regarding technology.

The system may then determine contextual factors including a sufficient cognitive capacity of the user as well as determinations that the user is not surprised/confused (e.g., by determining cognitive measurements of the user), that the user is familiar with the outcome (e.g., by parsing historical virtual content presented to the user and comparing it to the current virtual content), and that the model that determined the instructions has a level of certainty above a threshold (e.g., by identifying a certainty of the one or more machine learning/artificial intelligence environments that determined the instructions). After analyzing the above contextual factors, the system may determine that the presentation of the personalized XAI content 1004 needs to be manually triggered by the user (e.g., via the selection of a manual trigger icon 1008).

The system may then determine additional contextual factors by retrieving a system goal of building trust (clarifying the usage of data), and a user goal of privacy awareness (where the system goal and the user goal are stored in a database). The user's user profile may also be retrieved by the system and may indicate that the user is not familiar with AI.

These contextual factors may be input into a trained machine learning/artificial intelligence environment that produces personalized XAI content 1004 (e.g., where such content includes an explanation that "The system scans the plant's visual appearance" and that "The plant has abnormal spots on the leaves, which indicates fungi or bacteria infection.")

The system may also provide a detailed explanation including the full content of the additional contextual factors via a drop-down list in response to receiving a request for mor information via the selection of an icon 1006 by the user.

An analysis of the contextual factors by a machine learning/artificial intelligence environment may also determine that a visual modality is to be used for both the XAI content 1004 and the manual trigger icon 1008. In addition to using text as the primary format, abnormal spots on the leaves are also highlighted via circles 1010 to provide an in-situ explanation. Since the highlighting of spots is compatible with the environment (shown on the plant), it adopts the implicit pattern. The rest of the textual part of the explanation uses the explicit pattern.

Figure 11:
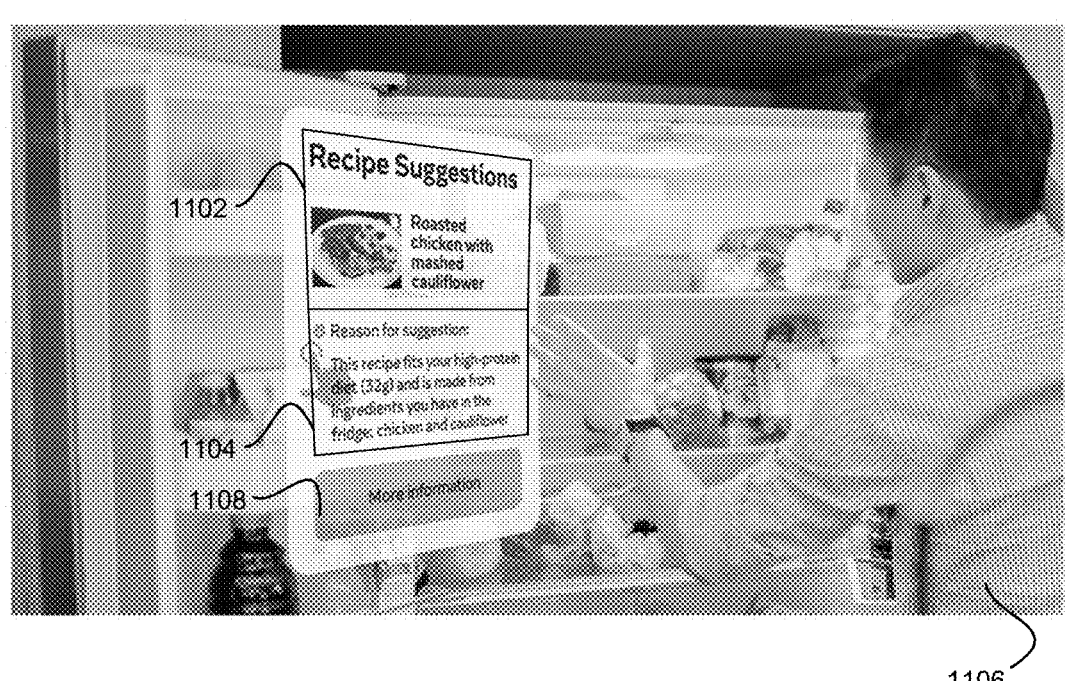
FIG. 11 is an illustration of an exemplary scenario including a recipe recommendation and personalized XAI content for a user opening a refrigerator, in accordance with various embodiments.

FIG. 11 illustrates an exemplary scenario 1000 including a recipe recommendation and personalized XAI content 1104 for a user 1106 opening a refrigerator, according to one embodiment. In one embodiment, a system (such as the client system 500 of FIG. 5) obtains input data via a head-mounted device of a user 1106. The input data may include environmental information (e.g., that the user 1106 is currently opening a refrigerator, the time is noon, and the environment includes ingredients within the refrigerator). The input data may also include user state information (e.g., that the user has a low cognitive load and may be holding an item). The input data may also include user profile information (e.g., that the user prefers high-protein food, that the user prefers certain recipes and food items, etc.). Various examples of how such input data is obtained are shown in block 602 of FIG. 6.

Based on the input data, the system then determines and presents virtual content 1102 (such as recipe suggestions) to the user 1106. For example, the system may determine and present a high-protein recipe suggestion for a lunchtime meal. Various examples of how such virtual content 1102 is determined is shown in block 604 of FIG. 6.

Additionally, the system then determines one or more contextual factors associated with the virtual content 1102. For example, the system may determine one or more system goals (assisting the user to find a good recipe), one or more user goals (making sure recipes fit the user's diet), and one or more components of a user profile (high protein food preferences). Various examples of how such contextual factors are determined is shown in block 606 of FIG. 6.

Further, the system then determines and presents XAI content 1104 to the user 1106, based on the one or more contextual factors. For example, the XAI content 1104 may include an explanation that the recipe presented as virtual content 1102 was presented because the recipe fits a high-protein diet and utilizes items currently in the refrigerator of the user 1106. Various examples of how such XAI content determined is shown in block 608 of FIG. 6.

Further still, a selectable option 1108 for more detail may also be presented to the user 1106. In response to determining that the user 1106 selects the selectable option 1108, additional information (such as an indication of one or more of the contextual factors) may be presented to the user 1106.

Figure 12:
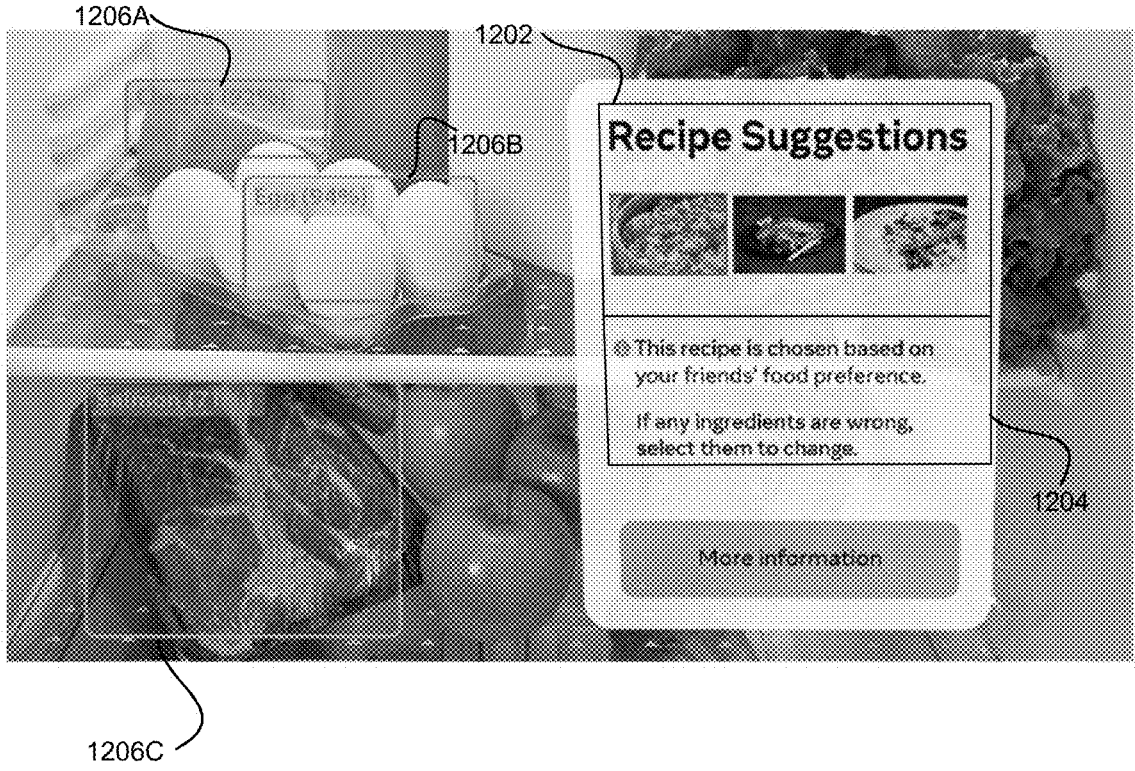
FIG. 12 is an illustration of exemplary details of provided XAI content, in accordance with various embodiments.

FIG. 12 illustrates exemplary details 1200 of provided XAI content, according to one embodiment. As shown, virtual content 1202 including recipe suggestions is provided by a system (such as the client system 500 of FIG. 5). The virtual content 1202 includes recipe suggestions determined based on input data (e.g., food items within a refrigerator, good preferences of a user, food preferences of friends of a user, etc.). Various examples of how such virtual content 1102 is determined is shown in block 604 of FIG. 6.

In addition, XAI content including a textual explanation 1204 of how the virtual content 1202 is determined and provided by the system. The XAI content includes visual identifications 1206A-C of each identified food item, where each visual identification 1206A-C includes a confidence level output by a machine learning/artificial intelligence environment used to identify the food items. Various examples of how such XAI content determined is shown in block 608 of FIG. 6.

In this way, a user can identify a visual identification of a food item (e.g., an incorrect identification 1206C that identifies steak as salmon), select the incorrect identification 1206C, and manually change the identification (e.g., to steak) in order to refine the virtual content 1202 provided to the user.

Explainable AI in Everyday Augmented Reality

Breakthroughs in Artificial Intelligence (AI) and Machine Learning (ML) have considerably advanced the degree to which interactive systems can augment our lives from various perspectives. As black-box ML models are increasingly being employed, concerns about human misusing AI and losing control have led to the need to make AI and ML algorithms easier for users to understand. This, in turn, has spurred rapidly growing interest into Explainable AI (XAI).

Studies have found that XAI can help end-users resolve confusion and build trust. It is therefore valuable to integrate XAI into everyday scenarios and improve user experiences.

Alongside the surge of interest into XAI, Augmented Reality (AR) is another technology making its way into everyday living. Advances in more lightweight, powerful, and battery-efficient Head-Mounted Displays (HMDs) have brought us closer to the vision of pervasive AR. As AI will be needed for context-aware, intelligent, everyday AR, XAI will also be essential because end-users will interact with various AI outcomes. XAI could be used to make intelligent AR behavior interpretable, resolve confusion or surprise when encountering unexpected AI outcomes, promote privacy awareness, and build trust.

With sensors to track various signals, AR can understand users' current state and their environment to provide a variety of smart services. For example, AR could infer user intent and provide contextual recommendations for daily activities (e.g., recipe recommendations when users open the fridge during lunch). The rich interaction between AI outcomes and end-users requires effectively designed XAI to support users in a variety of contexts, such as when users are confused or surprised while encountering unexpected AI outcomes, or when they want to make sure that AI outcomes are reliable and trustworthy.

There are several unique factors that distinguish AR from other platforms that highlight the necessity for a new XAI design framework. First, AR can have a much deeper understanding of users' current state in real-time using various head-mounted sensors. Second, compared to other platforms, AR can have better understanding of a user's context with a higher resolution. Such richer information not only introduces new input to the intelligent AR system by adding new content to explanations, but also influences the design of XAI as it needs to be tailored to user status and context. Third, from the interface perspective, the ability to be always-on and 3D-aware enables AR to present information at any time, and spatially adapt the interface to the physical world. These factors influence the design of XAI interfaces, as they need to be presented to users in an appropriate, efficient, and effective way. Overall, these unique factors demonstrate how current frameworks are insufficient and there is a need for a new XAI design framework that is specifically for AR scenarios.

In one embodiment, two aspects may be considered regarding XAI content: the availability of explanations (i.e., whether to prepare explanations), and the timing of the explanation's delivery (i.e., when to show explanations). Providing user agency and control is important during human-AI interaction to maintain a positive user experience. Having explanations available and accessible is in line with the goal of user agency. With the ability to show information any time, AR can support various timing strategies when presenting explanations. Thus, it is important to find the appropriate method to deliver explanations to users. Two exemplary approaches include a manual-trigger approach (i.e., initiated by users), and an auto-trigger approach (i.e., initiated by the system).

Additional XAI considerations include the content of the explanations (i.e., what content to include) and the level of detail of the explanations (i.e., how much to explain). Interface design is another consideration, including modality and paradigm dimensions.

Multiple factors may be considered when determining XAI content. These factors may include a user state. For example, potential sensors that could be integrated with future HMDs would empower an AR system to have a rich and instant understanding of user's state, such as activities (captured using an IMU and/or egocentric camera), a cognitive load (captured using eye tracking, and/or EEG), attention (captured using eye tracking, IMU, and/or EEG), emotion (captured using facial tracking and/or EEG) and potential intent (captured using a combination of multiple sensors and low-level intelligence).

Depending on user state, the design of explanations may be different. For example, when users are engaging in activities with a high cognitive load, explanations may not show up automatically to interrupt users.

Additionally, the factors may include contextual information. For example, other than knowing location and time, an HMD may include an egocentric camera and LiDAR, combined with other sensors (e.g., Bluetooth, WiFi, RFID), to identify details about various digital and non-digital objects in the environment, and have a better understanding of the semantics of a scene. Such contextual information would also influence the design of XAI. For instance, an explanation interface of recipe recommendations when users open a refrigerator may be different from the explanations of podcast suggestions while driving.

Further, the factors may include system goals. These system goals may include user intent discovery. When an AI generates suggestions for a new topic, the system often aims to help users discover new intent. For example, when a user is traveling in a city, the system may recommend several attractions and local restaurants to check out. Both the recommendation and explanations help the user explore new things that they were not aware of.

Further still, the system goals may include user intent assistance. For example, when a target task has been already initiated by users, then the goal of generating AI outcomes and explanations may assist users with their existing intent. For instance, when a user is making dinner, intelligent instructions and explanations are meant to suggest alternative ingredients based on what the user has in their space.

Also, the system goals may include error management. For example, when a system has low confidence about input/output or makes a mistake, explanations can serve as error management and explain the process so that users can understand where the error comes from, how they might better collaborate with the system, or when to adjust their expectation of the system's intelligence.

In addition, the system goals may include trust building. For example, explanations can help a system build trust with users by offering transparency and increasing intelligibility. As a result, users' trust in models leads them to rely on the system.

Furthermore, the factors may include user goals. These user goals may include resolving confusion/surprise. For example, Users can become confused or surprised when AI outcomes are different from what users are expecting, and having explanations can help to resolve the concerns. The user goals may also include privacy awareness. For example, as AI influences more aspects of daily living, invasion of privacy concerns are also growing. Explanations can disclose to end-users what data is being used in a model's decision-making process.

Further still, the user goals may include reliability. For example, ensuring the reliability and accountability of AI outcomes may be useful for non-trivial decision-making processes, so that users can rely on a trustworthy system (e.g., for daily activity recommendations for personal healthcare management or automatic emergency service contact for safety-threatening incidents).

Also, the user goals may include informativeness. For example, end-users can be curious and want to know more about the reason or process behind AI outcomes.

Additionally, the factors may a user profile. The user profile may include information such as demographics and user preferences, end users' familiarity with system outcomes, users' digital literacy with AI, and individual preferences about interface designs.

XAI results may be delivered in multiple ways. For example, a default option may be to wait until users manually request results. For example, a button may be provided with an information icon that enables users to click on it to see explanations. However, XAI results may be automatically presented in cases where users have an expectation mismatch and become surprised/confused about the AI outcomes. An example may include an intelligent reminder to bring umbrella when users are leaving home on a sunny morning (but it will rain in the afternoon). Automatic explanations of the weather forecast would help resolve users' confusion.

Additionally, XAI results may be automatically presented in cases where users are unfamiliar with new AI outcomes (e.g., indicated via history information within a user profile). For example, users may receive a recommendation of a song that they have never heard before, and an automatic explanation how the song was determined can help users to better understand the recommendation.

Further, XAI results may be automatically presented in cases where a model's input or output confidence is not high and the model may make mistakes. For instance, a system turning on a do-not-disturb mode when it detected a user working on a laptop in an office when the activity recognition confidence was not high (e.g., 80%) may trigger the automatic presentation of XAI results. Explanations could be a gatekeeper if the detection was wrong and users could calibrate their expectations or adjust the system to improve it.

The above cases may have a prerequisite that users have enough capacity to consume explanations (e.g., users' cognitive load is not high), and users have enough time to do so (which may be inferred based on context).

In AR systems, the AI outcomes are based on factors such as user state (e.g., user activity), contextual information (e.g., the current environment), and user profile (e.g., user preference). These factors also determine the content of different explanation categories. To choose the right categories, three factors may be considered.

The first category includes a system goal. Different system goals may require different explanations. For example, when the system recommends that users check out a new clothing store (to fulfill user intent discovery), presenting examples of similar stores that users are interested in and why this store is attractive to users can be helpful. When the system wants to calibrate users' expectation of an uncertain recipe recommendation (to fulfill error management), showing examples is less meaningful, compared to presenting how and why the system recommended this recipe, and how to change output if users want to.

The second category includes a user goal. Different user goals may also require different explanations. For instance, certainty explanations are helpful when users want to make sure an exercise recommendation fits their health plan (to fulfill reliability), while such explanation would be not useful when users want to be more aware of what data the AR system uses (to fulfill privacy awareness).

The third category includes a user profile, specifically user literacy with AI. For many end-users who are not familiar with the techniques behind AI, a condensed explanation may be sufficient, whereas if a user has high AI literacy, then a more detailed explanation may be considered.

After picking the right content, default explanations may be concise and may be further simplified by highlighting the most important categories. AR systems may also provide a portal for end-users to explore more details.

Considering channel bandwidth, visual and audio channels may be two primary modalities for the presentation of AR. Since explanations usually come with or after AI outcomes, a default modality of explanations may be the same as that of AI output to maintain consistency. For cases when outcomes use a haptic modality (e.g., vibration as a reminder), audio channels may be used when necessary. However, if a modality is overloaded (based on user state and contextual information), another modality may be used. For example, when users are driving and the navigation app suggests another detour route, although the AI outcomes are visual, the explanations may be audio to avoid visual overload. When users are in a loud environment, a vibration-based AI outcome may utilize a visual modality for explanations.

In one embodiment, text may be a primary format for delivering XAI content. Text may take up less space in a limited AR interface, and may introduce relatively less cognitive load. Moreover, the textual format may be more universal and may cover all categories. Graphics may be used as the secondary format for delivering XAI content. For default explanations, in addition to displaying a short and concise textual paragraph, simple graphical formats such as icons may be used to provide additional information. For detailed explanations, more complex graphical formats (e.g., example images or heatmaps) may be used as long as they are easy for end-users to understand.

Independent of the format, explanations may be presented in an implicit or explicit pattern. Given the capability of depth sensing and 3D registration in AR, the implicit pattern may be used when the explanation content is compatible with the environment (i.e., can be naturally embedded as a part of the environment). For example, for book recommendations, a text cue or a small icon can float on the book to indicate the book's style that users like. When explanations and the environment are not compatible, using an explicit pattern (e.g., a dialogue window) may be utilized. AR systems may utilize techniques such as knowledge graphs (i.e., networks of real-world entities and their relationships) to assess the compatibility between the content and the environment, and may use such assessment to determine presentation details.

Illustrative Device

FIG. 13 is an illustration of a portable electronic device 1300. The portable electronic device 1300 may be implemented in various configurations in order to provide various functionalities to a user. For example, the portable electronic device 1300 may be implemented as a wearable device (e.g., a head-mounted device, smart eyeglasses, smart watch, and smart clothing), communication device (e.g., a smart, cellular, mobile, wireless, portable, and/or radio telephone), home management device (e.g., a home automation controller, smart home controlling device, and smart appliances), a vehicular device (e.g., autonomous vehicle), and/or computing device (e.g., a tablet, phablet, notebook, and laptop computer; and a personal digital assistant). The foregoing implementations are not intended to be limiting and the portable electronic device 1300 may be implemented as any kind of electronic or computing device that is configured to provide an extended reality system and predict routines using a part of all of the methods disclosed herein.

The portable electronic device 1300 includes processing system 1308, which includes one or more memories 1310, one or more processors 1312, and RAM 1314. The one or more processors 1312 can read one or more programs from the one or more memories 1310 and execute them using RAM 1314. The one or more processors 1312 may be of any type including but not limited to a microprocessor, a microcontroller, a graphical processing unit, a digital signal processor, an ASIC, a FPGA, or any combination thereof. In some embodiments, the one or more processors 1312 may include a plurality of cores, one or more coprocessors, and/or one or more layers of local cache memory. The one or more processors 1312 can execute the one or more programs stored in the one or more memories 1310 to perform operations as described herein including those described with respect to FIG. 1-12.

The one or more memories 1310 can be non-volatile and may include any type of memory device that retains stored information when powered off. Non-limiting examples of memory include electrically erasable and programmable read-only memory (EEPROM), flash memory, or any other type of non-volatile memory. At least one memory of the one or more memories 1310 can include a non-transitory computer-readable storage medium from which the one or more processors 1312 can read instructions. A computer-readable storage medium can include electronic, optical, magnetic, or other storage devices capable of providing the one or more processors 1312 with computer-readable instructions or other program code. Non-limiting examples of a computer-readable storage medium include magnetic disks, memory chips, read-only memory (ROM), RAM, an ASIC, a configured processor, optical storage, or any other medium from which a computer processor can read the instructions.

The portable electronic device 1300 also includes one or more storage devices 1318 configured to store data received by and/or generated by the portable electronic device 1300. The one or more storage devices 1318 may be removable storage devices, non-removable storage devices, or a combination thereof. Examples of removable storage and non-removable storage devices include magnetic disk devices such as flexible disk drives and HDDs, optical disk drives such as compact disk (CD) drives or digital versatile disk (DVD) drives, SSDs, and tape drives.

The portable electronic device 1300 may also include other components that provide additional functionality. For example, camera circuitry 1302 may be configured to capture images and video of a surrounding environment of the portable electronic device 1300. Examples of camera circuitry 1302 include digital or electronic cameras, light field cameras, 3D cameras, image sensors, imaging arrays, and the like. Similarly, audio circuitry 1322 may be configured to record sounds from a surrounding environment of the portable electronic device 1300 and output sounds to a user of the portable electronic device 1300. Examples of audio circuitry 1322 include microphones, speakers, and other audio/sound transducers for receiving and outputting audio signals and other sounds. Display circuitry 1306 may be configured to display images, video, and other content to a user of the portable electronic device 1300 and receive input from the user of the portable electronic device 1300. Examples of the display circuitry 1306 may include an LCD, an LED display, an OLED screen, and a touchscreen display. Communications circuitry 1304 may be configured to enable the portable electronic device 1300 to communicate with various wired or wireless networks and other systems and devices. Examples of communications circuitry 1304 include wireless communication modules and chips, wired communication modules and chips, chips for communicating over local area networks, wide area networks, cellular networks, satellite networks, fiber optic networks, and the like, systems on chips, and other circuitry that enables the portable electronic device 1300 to send and receive data. Orientation detection circuitry 1320 may be configured to determine an orientation and a posture for the portable electronic device 1300 and/or a user of the portable electronic device 1300. Examples of orientation detection circuitry 1320 include GPS receivers, ultra-wideband (UWB) positioning devices, accelerometers, gyroscopes, motion sensors, tilt sensors, inclinometers, angular velocity sensors, gravity sensors, and inertial measurement units. Haptic circuitry 1326 may be configured to provide haptic feedback to and receive haptic feedback from a user of the portable electronic device 1300. Examples of haptic circuitry 1326 include vibrators, actuators, haptic feedback devices, and other devices that generate vibrations and provide other haptic feedback to a user of the portable electronic device 1300. Power circuitry 1324 may be configured to provide power to the portable electronic device 1300. Examples of power circuitry 1324 include batteries, power supplies, charging circuits, solar panels, and other devices configured to receive power from a source external to the portable electronic device 1300 and power the portable electronic device 1300 with the received power.

The portable electronic device 1300 may also include other I/O components. Examples of such input components can include a mouse, a keyboard, a trackball, a touch pad, a touchscreen display, a stylus, data gloves, and the like. Examples of such output components can include holographic displays, 3D displays, projectors, and the like.

Additional Considerations

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. An extended reality system comprising:
one or more processors communicatively coupled with:
    a head-mounted device comprising a display to display content to a user, and
    one or more sensors to capture input data including images of a visual field of the user;
and
one or more memories accessible to the one or more processors, the one or more memories storing a plurality of instructions executable by the one or more processors, the plurality of instructions comprising instructions that when executed by the one or more processors cause the one or more processors to perform processing comprising:
    obtaining the input data at the head-mounted device of the user,
    determining virtual content to be presented to a user via the head-mounted device, based on the input data,
    identifying one or more contextual factors associated with the virtual content,
    determining explainable artificial intelligence (XAI) content that describes one or more aspects of the virtual content, based on the virtual content and the one or more contextual factors, and
    causing presentation of a first virtual object including the virtual content and a second virtual object including the explainable artificial intelligence content in an extended reality environment displayed to the user utilizing the head-mounted device.

2. The extended reality system of claim 1, wherein the input data includes:
environmental information that describes a current environment of the user, user state information that describes a current state of the user, and
user profile information that describes one or more preferences of the user.

3. The extended reality system of claim 1, wherein determining the virtual content to be presented to the user via the head-mounted device includes:
providing the input data as input into one or more trained machine learning environments; and
retrieving, from the one or more trained machine learning environments, the virtual content.

4. The extended reality system of claim 1, wherein the explainable artificial intelligence content includes an identification of one or more instances of the input data used to determine the virtual content, the input data including one or more of environmental information, user state information, and user profile information.

5. The extended reality system of claim 1, wherein determining the explainable artificial intelligence content includes analyzing the determination of the virtual content to identify specific input data used to determine the virtual content, wherein the specific input data is included within the explainable artificial intelligence content.

6. The extended reality system of claim 1, wherein determining the explainable artificial intelligence content includes analyzing the determination of the virtual content to identify one or more weights assigned to the input data during the determination of the virtual content, wherein the one or more weights are included within the explainable artificial intelligence content.

7. The extended reality system of claim 1, wherein determining the explainable artificial intelligence content includes analyzing the determination of the virtual content to identify one or more methods applied to the input data to determine the virtual content, wherein the one or more methods are included within the explainable artificial intelligence content.

8. The extended reality system of claim 1, wherein:

the one or more contextual factors include a user profile, and in response to determining that the user profile indicates that a user's technological literacy of artificial intelligence is low, the determination of the virtual content is analyzed to identify specific input data used to determine the virtual content, wherein the specific input data is included as explainable artificial intelligence content, and one or more methods applied to the specific input data to determine the virtual content are withheld as explainable artificial intelligence content.

9. The extended reality system of claim 1, wherein the explainable artificial intelligence content is automatically presented to the user in response to determining that:

a current cognitive load of the user is below a first predetermined threshold, and a current amount of available time for the user is above a second predetermined threshold.

10. The extended reality system of claim 1, wherein the explainable artificial intelligence content is automatically presented to the user in response to determining an existence of an expectation mismatch within the virtual content, as well as a determination that a current emotion of the user includes surprise, confusion, or surprise and confusion.

11. The extended reality system of claim 1, wherein the explainable artificial intelligence content is automatically presented to the user in response to determining that the virtual content includes an outcome that is unfamiliar to the user.

12. The extended reality system of claim 1, wherein the explainable artificial intelligence content is automatically presented to the user in response to determining that a confidence associated with the virtual content is below a predetermined threshold.

13. The extended reality system of claim 1, wherein the one or more contextual factors associated with the virtual content include:

one or more system goals, one or more user goals, and one or more components of a user profile.

14. The extended reality system of claim 1, wherein the one or more contextual factors associated with the virtual content include a current state of the user, the current state of the user including:

a current state of the user, a current location of the user, a current time, and a current environment of the user.

15. The extended reality system of claim 1, wherein the processing further comprises determining a timing of a presentation of the explainable artificial intelligence content, and a presentation format for the explainable artificial intelligence content, based on the virtual content and the one or more contextual factors.

16. The extended reality system of claim 1, wherein the processing further comprises selecting a second modality to present the explainable artificial intelligence content in response to determining that an amount of information currently being presented via a first modality used to present the virtual content is above a predetermined threshold amount.

17. The extended reality system of claim 1, wherein the processing further comprises:

determining a level of compatibility between the explainable artificial intelligence content and a current view of the user;

presenting the explainable artificial intelligence content in an implicit pattern in response to determining that the level of compatibility between the explainable artificial intelligence content and the current view of the user is greater than a predetermined threshold; and presenting the explainable artificial intelligence content in an explicit pattern in response to determining that the level of compatibility between the explainable artificial intelligence content and the current view of the user is less than a predetermined threshold.

18. The extended reality system of claim 1, wherein the explainable artificial intelligence content is initially presented with a first level of detail, with a selectable option to provide a second level of detail greater than the first level of detail.

19. A method comprising:

obtaining input data at a head-mounted device of a user;

determining virtual content to be presented to a user via the head-mounted device, based on the input data;

identifying one or more contextual factors associated with the virtual content;

determining explainable artificial intelligence (XAI) content that describes one or more aspects of the virtual content, based on the virtual content and the one or more contextual factors; and causing presentation of a first virtual object including the virtual content and a second virtual object including the explainable artificial intelligence content in an extended reality environment displayed to the user utilizing the head-mounted device.

20. One or more non-transitory computer-readable media storing computer-readable instructions that, when executed by one or more processing systems, cause the one or more processing systems to perform operations including:

obtaining input data at a head-mounted device of a user;

determining virtual content to be presented to a user via the head-mounted device, based on the input data;

identifying one or more contextual factors associated with the virtual content;

determining explainable artificial intelligence (XAI) content that describes one or more aspects of the virtual content, based on the virtual content and the one or more contextual factors; and causing presentation of a first virtual object including the virtual content and a second virtual object including the explainable artificial intelligence content in an extended reality environment displayed to the user utilizing the head-mounted device.

* * * * *